(12) United States Patent
Bering et al.

(10) Patent No.: US 10,882,566 B2
(45) Date of Patent: Jan. 5, 2021

(54) REAR FENDER ASSEMBLIES FOR A WORK VEHICLE

(71) Applicant: Deere & Company, Moline, IL (US)

(72) Inventors: Christopher A. Bering, Dike, IA (US); Joshua J. Kappelman, Cedar Falls, IA (US); Amol Adsul, Pune (IN); Jeremy P. L'Heureux, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/278,831

(22) Filed: Feb. 19, 2019

(65) Prior Publication Data
US 2020/0262488 A1 Aug. 20, 2020

(51) Int. Cl.
*B62D 24/04* (2006.01)
*B62D 25/18* (2006.01)
*B62D 55/088* (2006.01)

(52) U.S. Cl.
CPC ........... *B62D 25/188* (2013.01); *B62D 24/04* (2013.01); *B62D 55/088* (2013.01)

(58) Field of Classification Search
CPC ..... B62D 25/188; B62D 24/04; B62D 55/088
See application file for complete search history.

(56) References Cited

U.S. PATENT DOCUMENTS

| 5,607,210 | A | * | 3/1997 | Brazier | ................. | B62D 55/04 |
| | | | | | | 305/131 |
| 5,758,932 | A | * | 6/1998 | Klopfenstein | ......... | B62D 55/06 |
| | | | | | | 305/115 |
| D439,586 | S | | 3/2001 | Moehle et al. | | |
| 8,020,948 | B2 | * | 9/2011 | Inaoka | ................. | B62D 55/088 |
| | | | | | | 180/9.1 |
| 8,882,121 | B2 | * | 11/2014 | Ducroquet | ........... | B62D 25/163 |
| | | | | | | 280/157 |
| D742,424 | S | | 11/2015 | Turner et al. | | |
| D747,747 | S | | 1/2016 | Turner et al. | | |
| D774,104 | S | | 12/2016 | Underhill et al. | | |
| 9,587,376 | B1 | | 3/2017 | Tanaka et al. | | |
| D802,027 | S | | 11/2017 | Underhill et al. | | |
| D819,705 | S | | 6/2018 | Ulmefors et al. | | |
| D849,061 | S | | 5/2019 | Underhill et al. | | |
| 10,370,038 | B2 | * | 8/2019 | Fujimoto | ................ | B60D 1/246 |
| 2008/0150355 | A1 | * | 6/2008 | Breton | ................. | B62D 55/088 |
| | | | | | | 305/107 |

(Continued)

OTHER PUBLICATIONS

John Deere, 9R/9RT/9RX Series Tractors Brochure, "The New Power of Choice", Sep. 2017.

(Continued)

*Primary Examiner* — Bryan A Evans

(74) *Attorney, Agent, or Firm* — Klintworth & Rozenblat IP LLP

(57) ABSTRACT

A track work vehicle includes a track system including a drive wheel supported by an axle housing that drives a continuous ground-engaging track, a saddle assembly that guides the track about the drive wheel and an undercarriage frame that supports one or more idler wheels that guide the track along a ground surface. The track work vehicle further includes a fender assembly that includes at least one fender coupled to the axle housing to overlap a portion of the track.

15 Claims, 30 Drawing Sheets

(56) References Cited

U.S. PATENT DOCUMENTS

| | | | |
|---|---|---|---|
| 2010/0051358 A1* | 3/2010 | Inaoka | B62D 55/088 180/9.1 |
| 2015/0345109 A1* | 12/2015 | Vik | E02F 9/02 180/9.42 |
| 2016/0288843 A1* | 10/2016 | Fujimoto | B62D 25/168 |
| 2019/0126991 A1* | 5/2019 | Wymore | B62D 25/18 |

OTHER PUBLICATIONS

USPTO Office Action issued in Design U.S. Appl. No. 29/680,663 dated Sep. 21, 2020.

* cited by examiner

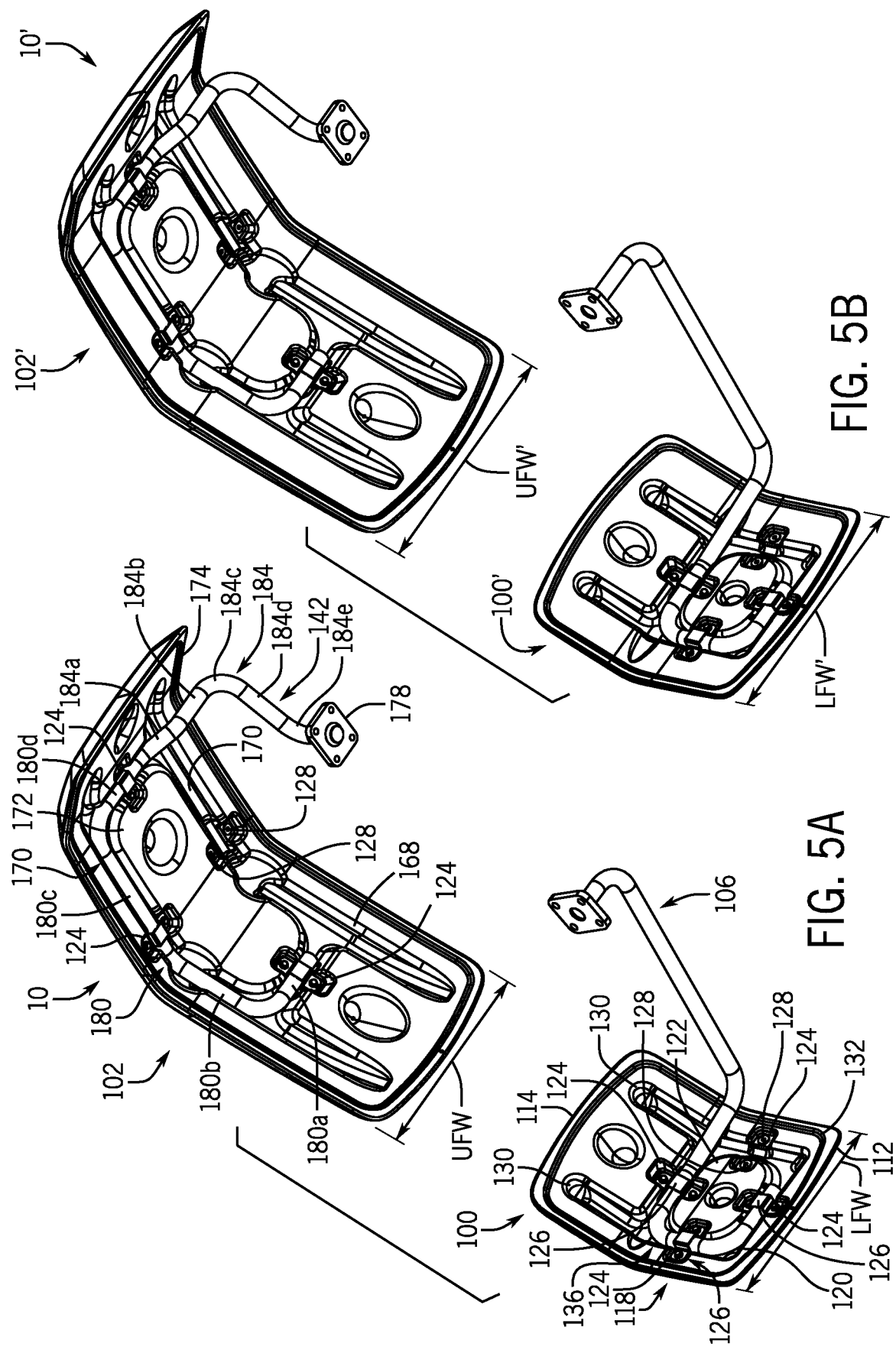

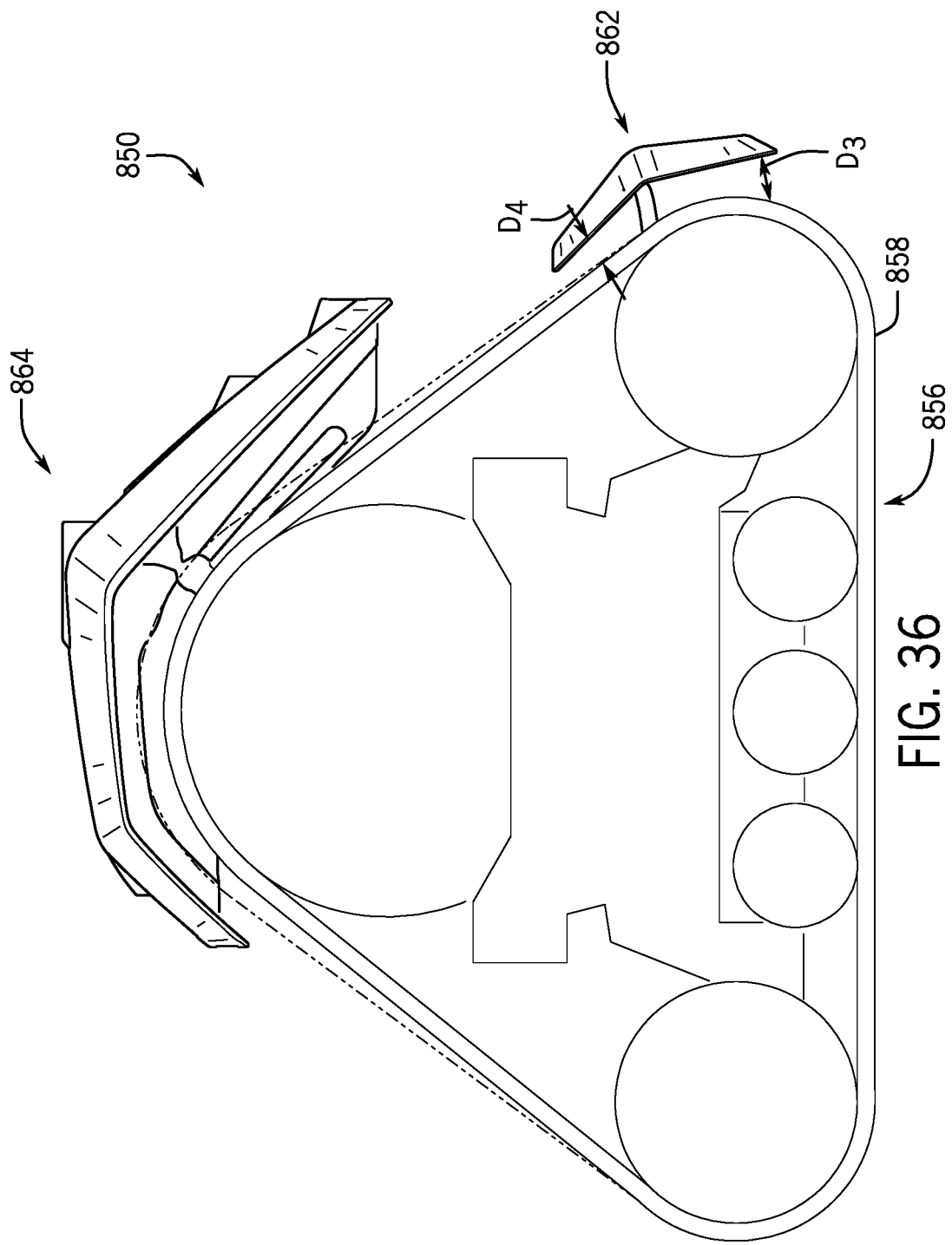

US 10,882,566 B2

REAR FENDER ASSEMBLIES FOR A WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, and to a front fender assembly and a rear fender assembly for a work vehicle.

BACKGROUND OF THE DISCLOSURE

Various work vehicles, such as tractors, are used in various operating conditions, including those involving mud, dirt or debris. The mud, dirt or other debris may obscure an operator's view out of an operator cab if allowed to accumulate on the operator cab. One or more fenders may be employed to reduce an accumulation of mud, dirt or debris on an operator cab. However, certain work vehicles, such as tractors, may include tracks that provide additional traction to enable the tractors to more easily move through rough or muddy fields. As the track tractor operates over the rough or muddy field, however, the tracks may oscillate, which may cause the tracks to contact or rub against a fender associated with the particular track. The contact between the fender may damage the track and/or the fender. Moreover, certain track work vehicles, such as track tractors, include an adjustable track width to enable the track work vehicle to be used in a variety of operating environments. Generally, in order to adjust a track width of a track work vehicle, a portion of a frame of the track work vehicle has to be elongated to increase a distance between the tracks, for example.

SUMMARY OF THE DISCLOSURE

The disclosure provides a front fender assembly and a rear fender assembly for a work vehicle that reduces an accumulation of debris on the operator cab, while enabling tracks of a work vehicle to oscillate without contacting the front fender assembly or rear fender assembly. In addition, the disclosure provides a front fender assembly and a rear fender assembly that enables a track width of the track work vehicle to be adjusted without interfering with the operation or coverage of the front fender assembly and rear fender assembly.

In one aspect, the disclosure provides a track work vehicle. The track work vehicle includes a track system. The track system includes a drive wheel supported by an axle housing that drives a continuous ground-engaging track, a saddle assembly that guides the track about the drive wheel and an undercarriage frame that supports one or more idler wheels that guide the track along a ground surface. The track work vehicle includes a fender assembly that includes at least one fender coupled to the track system to overlap a portion of the track.

In another aspect, the disclosure provides a track work vehicle. The track work vehicle includes a track system. The track system includes a drive wheel that drives a continuous ground-engaging track, a saddle assembly that guides the track about the drive wheel and an undercarriage frame that supports one or more idler wheels that guide the track along a ground surface. The track work vehicle includes a fender assembly. The fender assembly includes a front lower fender and a front upper fender. The front lower fender is coupled to the undercarriage frame and the front upper fender is coupled to the saddle assembly, and the front lower fender and the front upper fender are each spaced apart to overlap a respective portion of the track.

In another aspect, the present disclosure provides a track work vehicle. The track work vehicle includes a track system. The track system includes a drive wheel that drives a continuous ground-engaging track, a saddle assembly that guides the track about the drive wheel and an undercarriage frame that supports one or more idler wheels that guide the track along a ground surface. The track work vehicle includes a fender assembly. The fender assembly includes a front lower fender spaced apart from a front upper fender to overlap a respective portion of the track. The front lower fender is coupled to the undercarriage frame such that an end of the front lower fender extends below a centerline of one of the idler wheels. The front upper fender is coupled to the saddle assembly. Each of the front lower fender and the front upper fender includes a body and a support structure. The support structure of the front lower fender and the front upper fender interconnects the respective body to the respective one of the undercarriage frame and the saddle assembly. The body of each of the front lower fender and the front upper fender has a surface that defines a coupling channel, and the support structure of each of the front lower fender and the front upper fender has a first end that is at least partially received within the respective coupling channel.

In another aspect, the disclosure provides a track work vehicle with a track system. The track system includes a drive wheel that drives a continuous ground-engaging track, a saddle assembly that guides the track about the drive wheel and an undercarriage frame that supports one or more idler wheels that guide the track along a ground surface. The track work vehicle includes a fender assembly. The fender assembly includes a rear fender that is coupled to an axle housing of the track system such that the rear fender overlaps a respective portion of the track.

The details of one or more embodiments are set forth in the accompanying drawings and the description below. Other features and advantages will become apparent from the description, the drawings, and the claims.

BRIEF DESCRIPTION OF THE DRAWINGS

FIG. 5A is a rear perspective view of the front fender assembly for use with the left side of the track tractor of FIG. 1 having a track with a narrow width;

FIG. 5B is a rear perspective view of a front fender assembly for use with the left side of a track tractor similar to the track tractor of FIG. 1 having a track with a wide width;

FIG. 36 is a side detail view of a track system of the track tractor of FIG. 35, taken from 36, which illustrates a position of the rear fender assembly during an oscillation of the track.

Like reference symbols in the various drawings indicate like elements.

DETAILED DESCRIPTION

Figure 1:
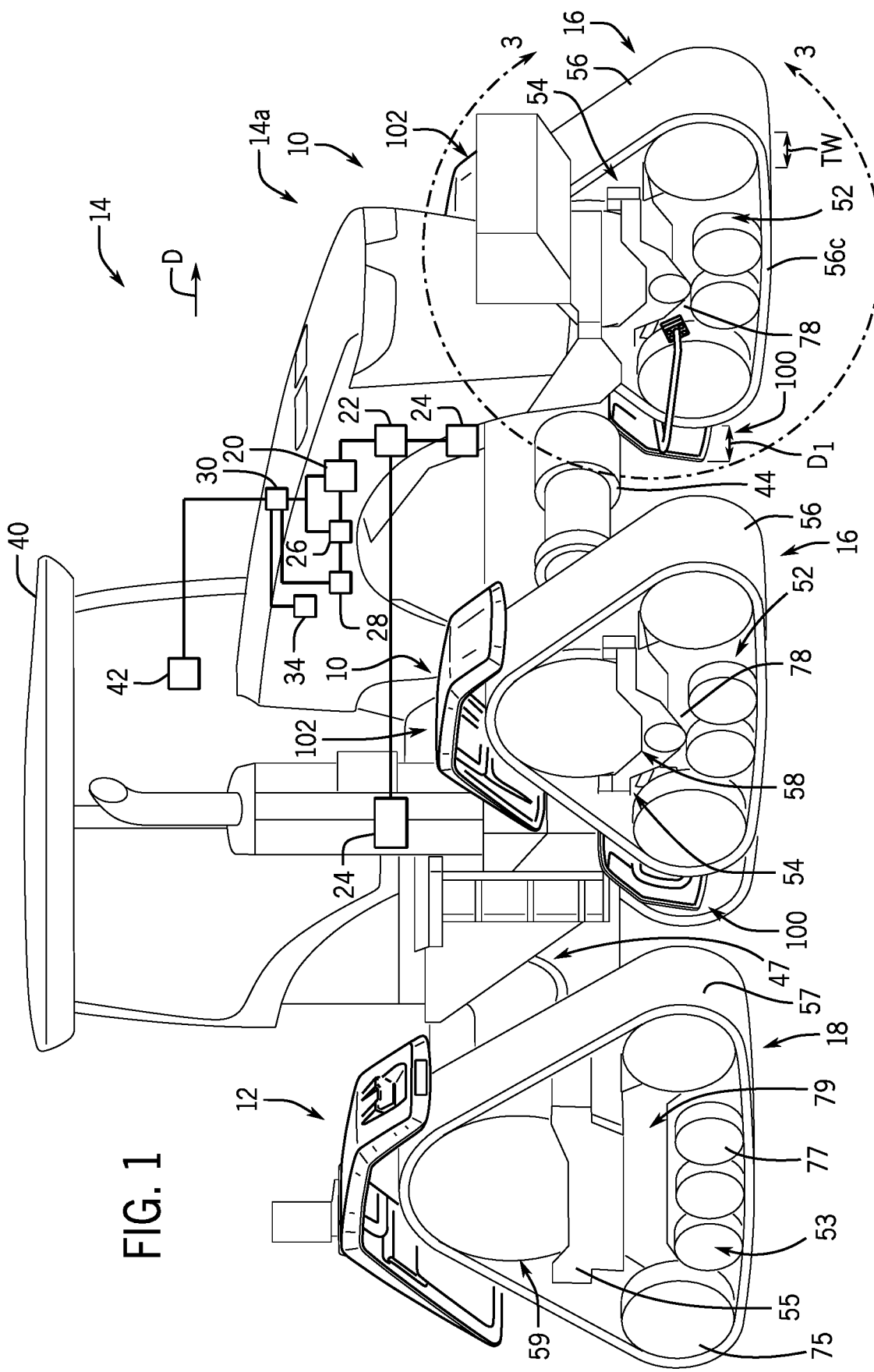
FIG. 1 is a right front perspective view of an example work vehicle in the form of a track agricultural tractor in which the disclosed front fender assembly and rear fender assembly may be used.

The following describes one or more example embodiments of the disclosed front fender assembly and rear fender assembly for a work vehicle, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a direction that is generally parallel to an axis of rotation, axis of symmetry, or centerline of a component or components. For example, in a cylinder or disc with a centerline and opposite, generally circular ends or faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

The following description relates to a work vehicle as a tractor. As used below, unless otherwise noted, the term "longitudinal" may encompass an orientation parallel to an axis extending between the front of the tractor and the rear of the tractor (e.g., forward and aft or forward and reverse). Similarly, the term "lateral" may encompass an orientation parallel to an axis extending from one side of the tractor to the other, perpendicular to the longitudinal orientation. The term "vertical" may encompass an orientation parallel to an axis extending between the top and bottom of the tractor, perpendicular to the longitudinal and lateral orientations. The terms "inboard" and "outboard" may refer to relative lateral directions with respect to a central longitudinal axis of the tractor. For example, "inboard" refers to a relative direction towards the center of the tractor, and "outboard" refers to a relative direction away from the center of the tractor.

Discussion herein may sometimes focus on the example application of a track work vehicle as a track tractor. It should be noted, however, that the present disclosure is not limited to a track work vehicle or a track tractor, but rather, the front fender assembly and rear fender assembly may be applied to other types of track or non-track vehicles, including a wheeled work vehicle.

Conventionally, front fenders and rear fenders may be coupled to a cab of the work vehicle. In the example of a track work vehicle having an adjustable track width, the adjustment of the track width to a wider track may result in the front fender and the rear fender not covering all of the track or only covering a portion of the track. This may enable dirt or debris to accumulate on the cab of the work vehicle, which is undesirable. Moreover, in certain instances, as the track of the track work vehicle oscillates the track may contact or rub against the stationary front fenders or rear fenders. This may cause wear or damage to the track, front fenders and/or rear fenders, which is also undesirable.

This disclosure provides an alternative to the conventional front fenders and rear fenders by providing a front fender assembly and a rear fender assembly that are each coupled to the track system. By coupling the front fender assembly and rear fender assembly to the track system, the front fender assembly and rear fender assembly are closer to the track and overlap the track completely, which reduces an accumulation of debris on the cab of the track worked vehicle. Stated another way, by coupling the front fender assembly and rear fender assembly to the track system, the front fender assembly and the rear fender assembly maintain a position over a top of the track or maintain coverage over the track such that debris accumulation on the cab is reduced. Generally, each of the fender assemblies respectively overlap the associated track such that there is about 1 millimeter (mm) to about 3 millimeters (mm) of overlap in width.

Moreover, by coupling the front fender assembly and the rear fender assembly to the track system, the front fender assembly and the rear fender assembly move with the track systems. Thus, as the tracks oscillate during an operation of the track work vehicle, the front fender assembly and the rear fender assembly move with the track system such that a substantially constant clearance is maintained between the front fender assembly and the rear fender assembly during the operation of the track work vehicle and contact between the tracks, the front fender assembly, and the rear fender assembly is substantially inhibited.

In one example, the disclosed front fender assembly includes a front lower fender and a front upper fender, which may be employed on a left and a right side of the tractor. The front lower fender and the front upper fender are available in at least two sizes, which in one example, correspond with three different widths of track for a track work vehicle. This enables the front fender assembly to be used with a variety of track work vehicles. In this example, the front lower fender is coupled to an undercarriage frame of the track system, and the front upper fender is coupled to a saddle assembly of the track system. This enables both the front lower fender and the front upper fender to move with the track system. In addition, in certain embodiments, the front lower fender may be coupled to an undercarriage of a track system associated with a rear of the work vehicle to enable additional coverage of the track.

In one example, the disclosed rear fender assembly includes a rear fender that may be employed on a left and a right side of the tractor. The rear fender is available in at least two sizes, which in one example, correspond with three different widths of track for a track work vehicle. This enables the rear fender assembly to be used with a variety of track work vehicles. In this example, the rear fender coupled to an axle housing of the track system. This enables the rear fender to move with the track system.

Figure 2:
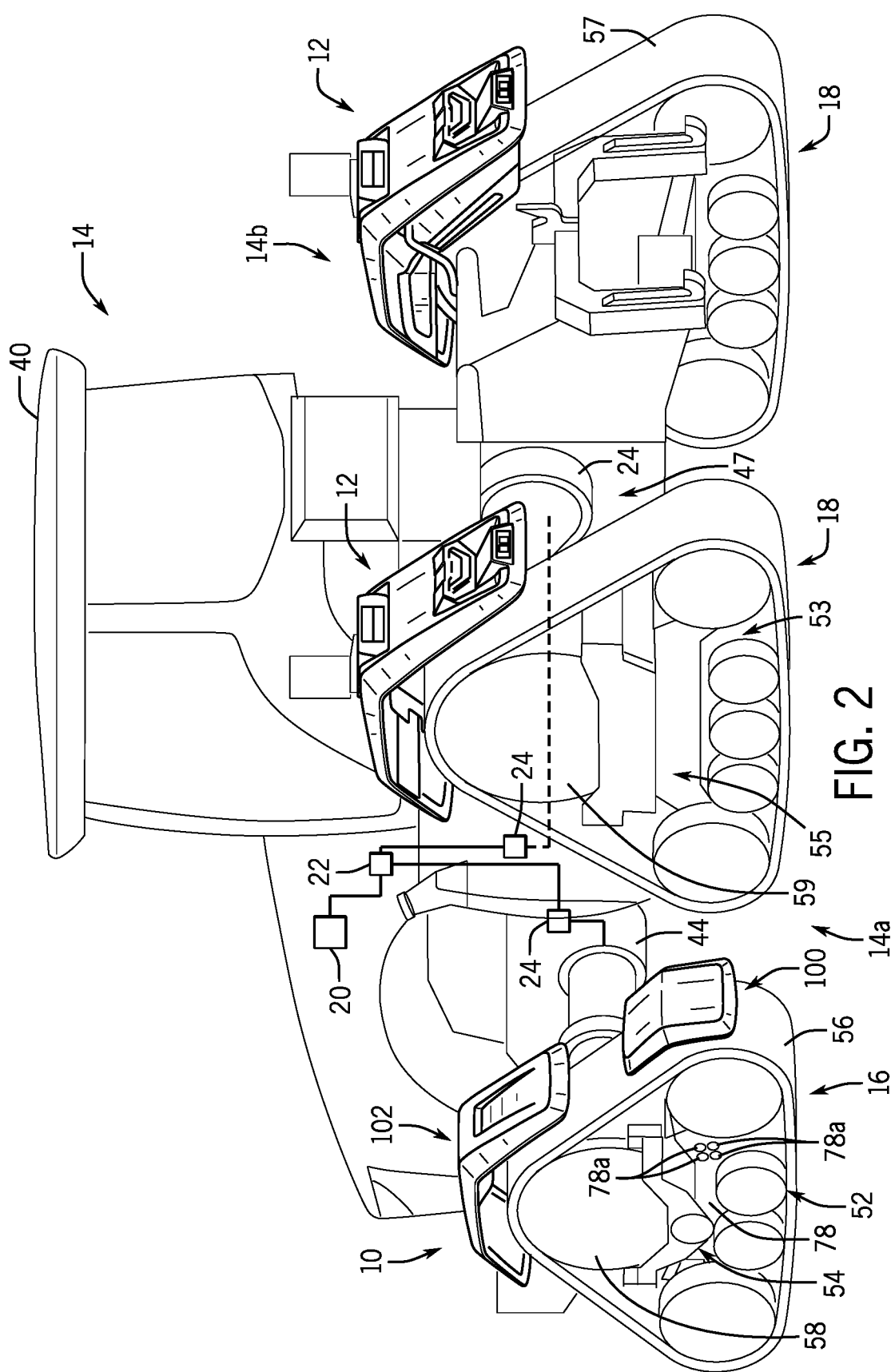
FIG. 2 is a left rear perspective view of the track tractor of FIG. 1.

The following describes an example front fender assembly and rear fender assembly for a work vehicle. The front fender assembly and rear fender assembly may be utilized with various machines or work vehicles, including tractors and other machines for in the agricultural and construction industries. Referring to FIGS. 1 and 2, in some embodiments, a front fender assembly 10 and a rear fender assembly 12 may be used with a tractor 14. It will be understood that the implementation of the front fender assembly 10 and the rear fender assembly 12 with the tractor 14 is presented as an example only. Other work vehicles, such as those used in the construction industry, may benefit from the disclosed front fender assembly 10 and the rear fender assembly 12 as well. Moreover, other agricultural vehicles, such as wheeled tractors, may benefit from the front fender assembly 10 and the rear fender assembly 12.

Referring to FIGS. 1 and 2, the tractor 14 is shown as a track work vehicle. With continued reference to FIG. 1, the tractor 14 includes a plurality of track systems 16, 18, and a source of propulsion, such as an engine 20. The engine 20 supplies power to a transmission 22. The transmission 22 transfers the power from the engine 20 to a suitable driveline 24 coupled to one or more of the track systems 16 of the tractor 14 to enable the tractor 14 to move. In one example, the engine 20 is an internal combustion engine, such as a diesel engine, that is controlled by an engine control module. It should be noted that the use of an internal combustion engine is merely exemplary, as the propulsion device can be a fuel cell, electric motor, a hybrid-electric motor, etc.

The tractor 14 also includes one or more pumps 26, which may be driven by the engine 20 of the tractor 14. Flow from the pumps 26 may be routed through various control valves 28 and various conduits (e.g., flexible hoses and lines) to control various components associated with the tractor 14. Flow from the pumps 26 may also power various other components of the tractor 14. The flow from the pumps 26 may be controlled in various ways (e.g., through control of the various control valves 28 and/or a controller 30 associated with the tractor 14).

Generally, the controller 30 (or multiple controllers) may be provided, for control of various aspects of the operation of the tractor 14, in general. The controller 30 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 30 may be configured to execute various computational and control functionality with respect to the tractor 14 (or other machinery). In some embodiments, the controller 30 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 30 (or a portion thereof) may be configured as an assembly of hydraulic components (e.g., valves, flow lines, pistons and cylinders, and so on), such that control of various devices (e.g., pumps or motors) may be implemented with, and based upon, hydraulic, mechanical, or other signals and movements.

The controller 30 may be in electronic, hydraulic, mechanical, or other communication with various other systems or devices of the tractor 14 (or other machinery, such as an implement coupled to the tractor 14). For example, the controller 30 may be in electronic or hydraulic communication with various actuators, sensors, and other devices within (or outside of) the tractor 14, including various devices associated with the pumps 26, control valves 28, and so on. The controller 30 may communicate with other systems or devices (including other controllers, such as a controller associated with an implement) in various known ways, including via a CAN bus (not shown) of the tractor 14, via wireless or hydraulic communication means, or otherwise.

Various sensors may also be provided to observe various conditions associated with the tractor 14. In some embodiments, various sensors 34 (e.g., pressure, flow or other sensors) may be disposed near the pumps 26 and control valves 28, or elsewhere on the tractor 14. For example, sensors 34 observe a pressure associated with the pumps 26 and generate sensor signals based thereon.

The tractor 14 also includes a cab 40, which includes a human-machine interface 42. The controller 30 receives input commands and interfaces with the operator via the human-machine interface 42.

As illustrated in FIG. 1, the tractor 14 includes a pair of the track systems 16 associated with a first or front axle assembly 44 of the tractor 14 in a forward driving direction D, and a pair of track systems 18 associated with a transmission output shaft or drive shaft (not shown) that is coupled to an axle input shaft (not shown) of a second or rear axle assembly 47 (only a portion of the rear axle assembly 47 is illustrated in FIGS. 1 and 2 for clarity). It should be noted that while the tractor 14 is illustrated herein as comprising the plurality of track systems 16, 18, it will be understood that the tractor 14 can include any number of track systems 16, 18, such as one or two. The track systems 16, 18 associated with the axle input shaft of the tractor 14 are each coupled to a differential gear case, which receives input torque from the transmission 22 via the axle input shaft.

Figure 3:
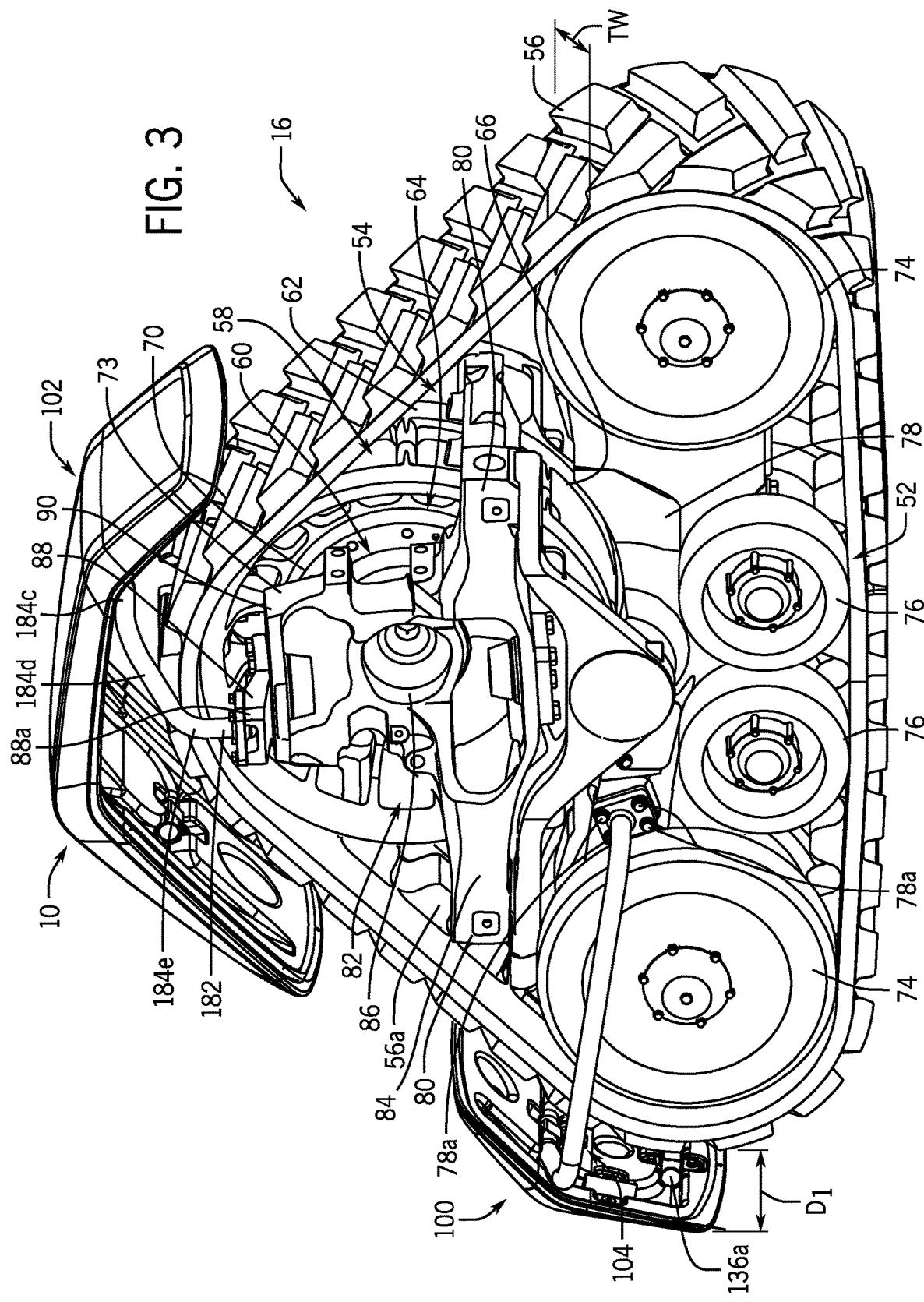
FIG. 3 is a detail view of a track system of the track tractor of FIG. 1, taken at 3 on FIG. 1, which includes the front fender assembly in accordance with various embodiments.

In this example, with reference to FIG. 3, a rear view of one of the track systems 16 associated with the front axle assembly 44 is shown. Generally, each of the track systems 16 includes an undercarriage assembly 52, a saddle assembly 54, a track 56 and a drive wheel 58 (see also FIG. 1 for a front view of the track system 16). The drive wheel 58 is fastened to a drive axle shaft (not shown) and supported by an axle housing 60. The drive wheel 58 is annular, and defines an outer circumference 62 and a drive wheel hub 64. Generally, the drive wheel 58 is composed of a metal or metal alloy, which is cast as one integral piece. It will be understood, however, that the drive wheel 58 can be composed of multiple pieces that are welded or otherwise fastened together. The outer circumference 62 defines a plurality of track guides 66 substantially continuously about a perimeter. In this example, the plurality of track guides 66 comprises a plurality of slots, which are spaced substantially evenly about the perimeter of the outer circumference 62 to transfer torque from the drive wheel 58 to the track 56. Generally, the plurality of track guides 66 each receive a respective one of a plurality of teeth 56a of the track 56 to drive the track 56 with the drive wheel 58.

The drive wheel hub 64 couples the drive wheel 58 to the axle housing 60. Generally, the drive wheel hub 64 defines one or more bores that receive a respective one of one or more mechanical fasteners to couple the drive wheel 58 to an axle flange 70 associated with the axle housing 60. The axle housing 60 is substantially cylindrical and substantially encloses the drive axle shaft (not shown), which is coupled to the axle flange 70. The axle flange 70 extends from the axle housing 60 to enable the rotation of the drive wheel 58 relative to the axle housing 60. The axle flange 70 is coupled to drive wheel hub 64 of the drive wheel 58 such that torque from the drive axle shaft (not shown) is transmitted to drive the drive wheel 58. The axle housing 60 also includes a flange 73, which couples the saddle assembly 54 to the axle housing 60. The flange 73 extends about a perimeter or circumference of the axle housing 60 at an end of the axle housing 60 that is substantially opposite an end of the axle housing 60 that is near or adjacent to the axle flange 70.

In one example, the undercarriage assembly 52 is movably or pivotally coupled to the saddle assembly 54. The undercarriage assembly 52 is not coupled to the drive wheel 58. Generally, the undercarriage assembly 52 includes a plurality of first idler wheels 74 and a plurality of bogey or second idler wheels 76, which are each supported for rotation relative to an undercarriage frame 78. In this example, the undercarriage assembly 52 includes two pairs of first idler wheels 74 and two pairs of second idler wheels 76. The first idler wheels 74 and second idler wheels 76 cooperate to guide the track 56 along the ground as it is driven by the drive wheel 58. It should be noted that this configuration of idler wheels 74, 76 is merely exemplary, as any number and arrangement of idler wheels may be employed. As will be discussed, in certain embodiments, a first or front lower fender 100 of the front fender assembly 10 is coupled to the undercarriage frame 78 such that the front lower fender 100 of the front fender assembly 10 moves with the undercarriage frame 78. In one example, with reference to FIG. 3, the undercarriage frame 78 includes a plurality of threaded bores 78a, which threadably receive a plurality of mechanical fasteners to couple the front lower fender 100 to the undercarriage frame 78.

The saddle assembly 54 includes a pair of arms 80 that each extend outwardly from an annular base 82. With reference to FIG. 1, each of the arms 80 extends outwardly from the base 82 so as to be positioned on opposite sides of the drive wheel 58. The arms 80 guide the track 56 as the track 56 moves about the drive wheel 58. With reference to FIG. 3, the arms 80 may each include a flange 84 that couples the respective arm 80 to the base 82. The flanges 84 may be curved to facilitate placement of the arms 80 about the drive wheel 58.

The base 82 defines a central bore 86, which enables the saddle assembly 54 to be removably coupled to the axle housing 60. By removably coupling the saddle assembly 54 to the axle housing 60, the saddle assembly 54 may be easily removed for maintenance or repairs. The base 82 defines a plurality of through-bores about a circumference of the bore 86, which receive a respective one of one or more mechanical fasteners to couple the base 82 to the flange 73 of the axle housing 60. In one example, the base 82 also defines a fender mounting platform 88 that extends from an upper flange 90 of the base 82. The upper flange 90 extends outwardly from the central bore 86, and the fender mounting platform 88 is defined on a top surface of the upper flange 90. As will be discussed, a second or front upper fender 102 of the front fender assembly 10 is coupled to the fender mounting platform 88. Generally, the fender mounting platform 88 defines a plurality of bores 88a for receipt of a plurality of mechanical fasteners to couple the front upper fender 102 to the saddle assembly 54.

The track 56 is continuous and is received about a perimeter of the drive wheel 58 and the undercarriage assembly 52. Generally, the track 56 is tensioned about the drive wheel 58 and the undercarriage assembly 52. In this example, the track 56 is composed of a polymeric material; however, the track 56 can be composed of a metal or metal alloy. An exterior surface of the track 56 includes a plurality of projections or treads (not shown), which project from the exterior surface to engage the terrain over which the tractor 14 travels. An interior surface includes the plurality of teeth (not shown) that extend outwardly from the interior surface to engage the drive wheel 58, the first idler wheels 74 and the second idler wheels 76 to move or drive the track 56 about the perimeter of the drive wheel 58 and the undercarriage assembly 52. The track 56 has a track system width TW, which is measured from a first side 92 of the track 56 to an opposite second side 94 of the track 56.

Figure 4A:
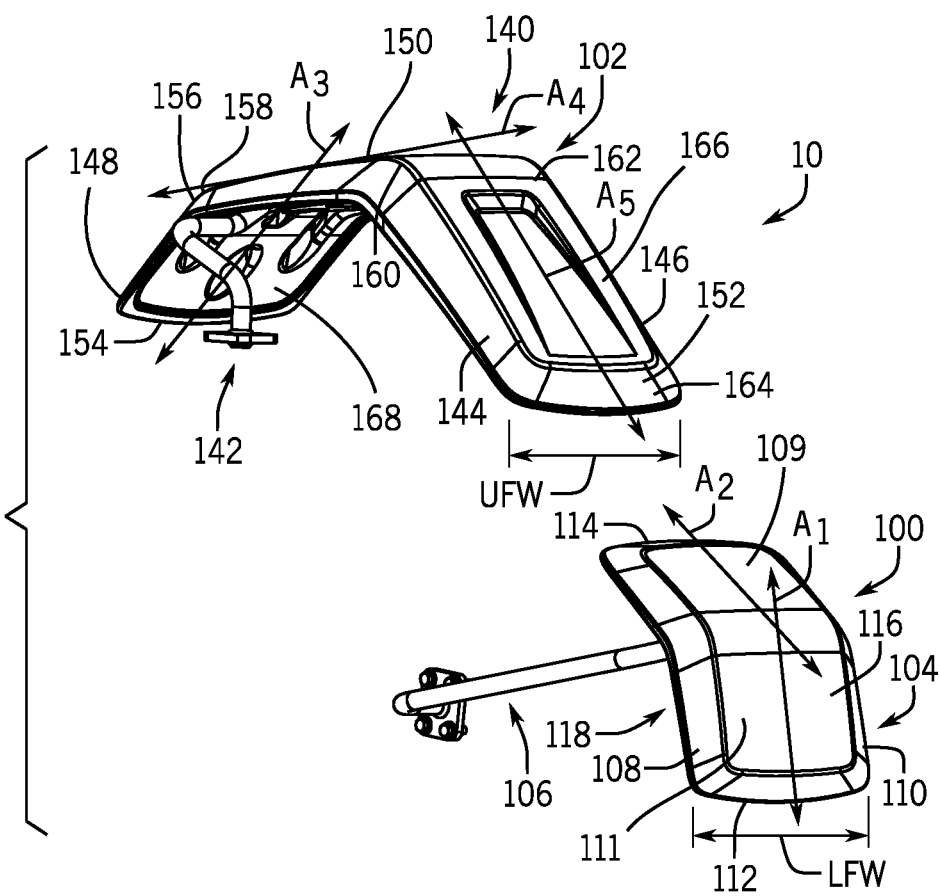
FIG. 4A is a front perspective view of the front fender assembly for use with a left side of the track tractor of FIG. 1 having a track with a narrow width.
Figure 4B:
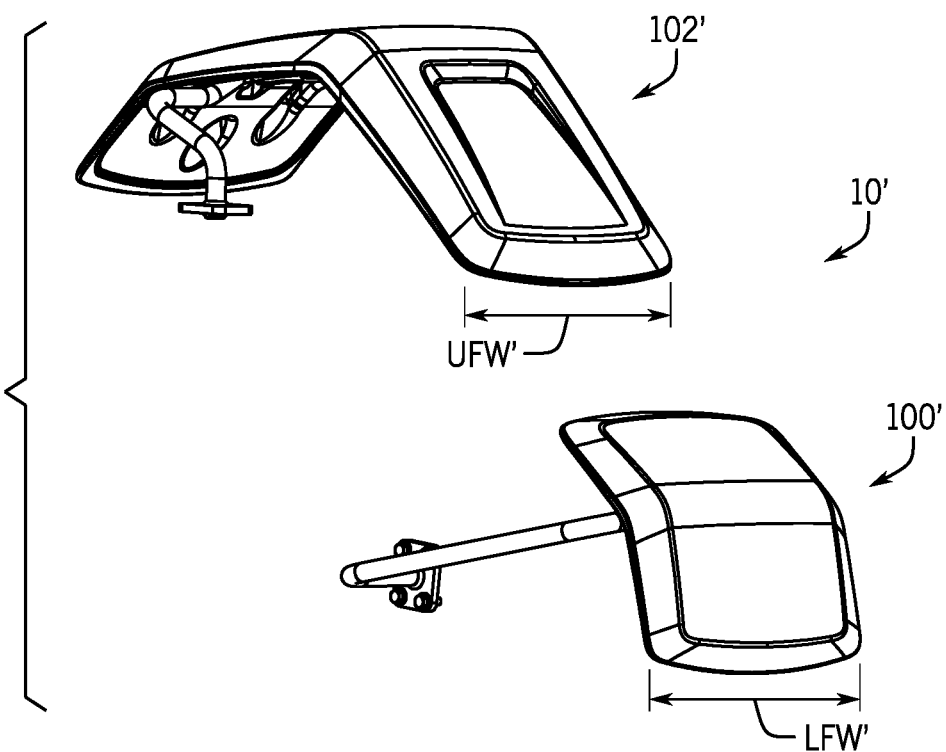
FIG. 4B is a front perspective view of a front fender assembly for use with a left side of a track tractor similar to the track tractor of FIG. 1 having a track with a wide width.

With reference to FIGS. 4A, 4B, 5A, and 5B, the front fender assembly 10 is shown. In the example of FIGS. 4A and 5A, the front fender assembly 10 is sized for a narrow track system width TW of track 56. In this example, the front lower fender 100 has a lower fender width LFW of about 18 inches (in.) and the front upper fender 102 has an upper fender width UFW of about 18 inches (in.) to accommodate a narrow width of track 56 of about 16.5 inches (in.) or about 18 inches (in.). Thus, generally, the front fender assembly 10 shown in FIGS. 4A and 5A is for use with a track 56 having a track system width TW of about 16.5 inches (in.) or about 18 inches (in.). With reference to FIGS. 4B and 5B, a front fender assembly 10' is shown. In the example of FIGS. 4B and 5B, the front fender assembly 10' is sized for a wide track system width TW of track 56. In this example, the front lower fender 100' has a lower fender width LFW' of about 24 inches (in.) and the front upper fender 102' has an upper fender width UFW' of about 24 inches (in.) to accommodate a wide width of track 56 of about 24 inches (in.). Thus, generally, the front fender assembly 10' shown in FIGS. 4B and 5B is for use with a track 56 having a track system width TW of about 24 inches (in.). By providing the front fender assembly 10, 10' in two different sizes, the front fender assembly 10 may be employed with tractors 14 having various different track system widths TW of track 56.

As the front fender assembly 10 is substantially the same as the front fender assembly 10' with the only difference being the widths LFW, LFW' and UFW, UFW' of the respective front lower fender 100, 100' and front upper fender 102, 102', for ease of description, only the front fender assembly 10 will be discussed in detail herein, with the understanding that the front fender assembly 10' is substantially the same.

FIGS. 4A, 4B, 5A, 5B, and 6 illustrate the front fender assembly 10 for use with the track system 16 associated with the front axle assembly 44 on a left side 14a (FIG. 2) of the tractor 14. In one example, the front lower fender 100 includes a lower fender body 104 and a lower fender support structure 106. In one example, the lower fender body 104 is composed of a polymer-based material and is formed via rotational molding. It should be noted, however, that the lower fender body 104 may be composed of any suitable material and may be formed using any desired technique, including, but not limited to, casting, injection molding, three-dimensional printing, etc.

The lower fender body 104 has the lower fender width LFW that is measured from an inboard lower fender edge 108 to an opposite outboard lower fender edge 110. The lower fender body 104 also includes an aft lower fender edge 112 opposite a forward lower fender edge 114.

The lower fender body 104 may be considered to include a first lower fender body section 109 and a second lower fender body section 111 arranged aft of the first lower fender body section 109. In one example, the second lower fender body section 111 extends at an angle to the first lower fender body section 109. Stated another way, the second lower fender body section 111 extends along an axis A1 that is substantially oblique to an axis A2 along which the first lower fender body section 109 extends. By extending at an angle, the second lower fender body section 111 of the front lower fender 100 assists in inhibiting dirt or other debris from accumulating on the cab 40 of the tractor 14.

The lower fender body 104 of the front lower fender 100 also includes a first or top surface 116 and an opposite second or bottom surface 118. The top surface 116 is substantially smooth; however, the top surface 116 may include one or more ribs or other features for aesthetics. The bottom surface 118 receives a portion of the lower fender support structure 106. In one example, with reference to FIG. 5, the bottom surface 118 includes a coupling channel 120 that is defined about a perimeter of a central base 122, and a plurality of fastening recesses 124.

The coupling channel 120 is recessed relative to the bottom surface 118 to define a channel or groove that receives as portion of the lower fender support structure 106. The coupling channel 120 is substantially annular and has a substantially U-shaped cross-section; however, the coupling channel 120 may have any desired shape that corresponds with the portion of the lower fender support structure 106. Generally, the coupling channel 120 and the central base 122 are defined on the bottom surface 118 of the front lower fender 100 near or adjacent to the second lower fender body portion 111. The central base 122 is substantially circular, but the central base 122 may have any desired shape. The plurality of pairs of fastening recesses 124 are spaced apart about a perimeter of the central base 122. Generally, the bottom surface 118 includes four pairs of fastening recesses 124, which are each configured to receive a respective end of one of a plurality of flanges 126. The pairs of fastening recesses 124 each define at least one threaded bore 128, which receives a threaded mechanical fastener, such as a bolt. In one example, the at least one threaded bore 128 comprises two threaded bores. It should be noted that in certain instances, the pairs of fastening recesses 124 may include threaded inserts, which are integrally formed during the rotational molding of the front lower fender 100. By including four pairs of fastening recesses 124 on the lower fender body 104 of the front lower fender 100, the lower fender body 104 of the front lower fender 100 may be used on both the right side 14b (FIG. 1) and the left side 14a (FIG. 2) of the tractor 14. In this example, each pair of the pairs of fastening recesses 124 includes a first flange recess and an opposite second flange recess, and each of the first flange recess and the second flange recess define one of the threaded bores 128. It should be noted that other fastening arrangements may be employed.

In certain instances, the bottom surface 118 also includes one or more recesses 130, which may impart rigidity and provide a mass savings. In addition, the bottom surface 118 may include a lip 132, which extends about the bottom surface 118 of the front lower fender 100 near a perimeter of the front lower fender 100. The lip 132 assists in inhibiting debris from the tracks 56 from accumulating on the cab 40 (FIG. 1).

Figure 6:
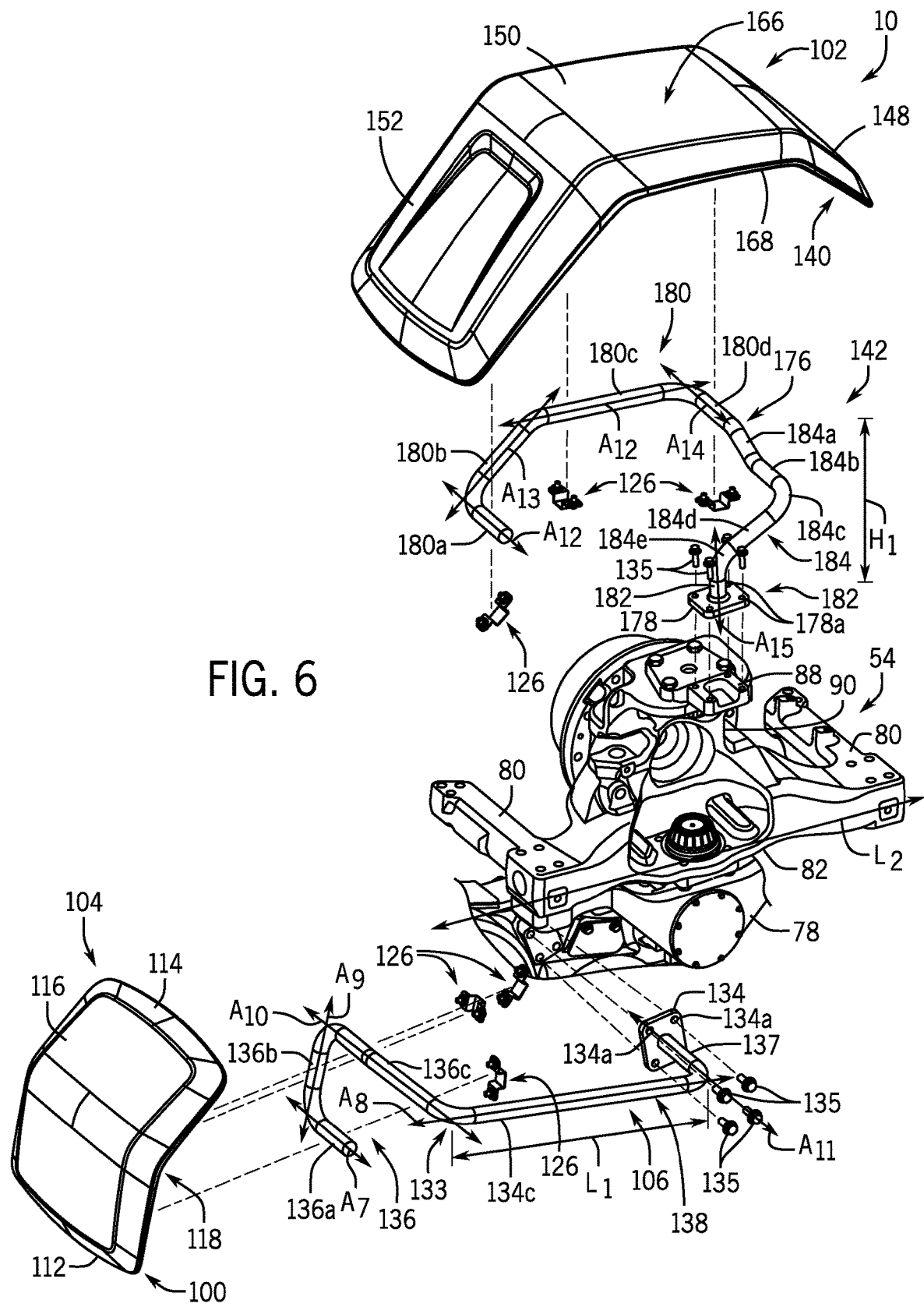
FIG. 6 is an exploded view of the front fender assembly for use with the left side of the tractor of FIG. 1.

With reference to FIG. 6, the lower fender support structure 106 is shown exploded from the front lower fender 100 and the undercarriage frame 78. In one example, the lower fender support structure 106 includes a mounting rod 133, a mounting flange 134, the plurality of fender flanges 126 and one or more mechanical fasteners 135 to couple the mounting rod 133 to the undercarriage frame 78.

The mounting rod 133 interconnects the front lower fender 100 with the undercarriage frame 78. In one example, the mounting rod 133 is composed of a metal or metal alloy, such as a steel. The mounting rod 133 may be formed using any suitable technique, including, but not limited to, forging, casting, extruding, machining, etc. The mounting rod 133 has a solid cylindrical shape; however, the mounting rod 133 may have any desired shape. The mounting rod 133 includes a first coupling end 136 and an opposite second mounting end 137 that are interconnected by a body section 138. In one example, the mounting rod 133 is bent or shaped to form the first coupling end 136 and the second mounting end 137. The first coupling end 136 forms a substantially C-shape, which is sized and shaped to correspond with the coupling channel 120 such that the first coupling end 136 may be received within the coupling channel 120. In this example, the first coupling end 136 has a first segment 136a, a second segment 136b and a third segment 136c. The first segment 136a defines a terminal end of the mounting rod 133 and extends along an axis A7, which is substantially perpendicular to an axis A8 of the body section 138. The second segment 136b interconnects the first segment 136a and the third segment 136c, and extends along an axis A9 that is substantially oblique to the axis A7. The third segment 136c is coupled to the body section 138, and extends along an axis A10, which is substantially perpendicular to the axis A8. The axis A10 of the third segment 136c and the axis A7 of the first segment 136a are not coplanar. Stated another way, the first segment 136a is angled relative to the third segment 136c.

The second mounting end 137 extends radially outward from the body section 138 along an axis A11, which is substantially perpendicular to the axis A8 of the body section 138. The second mounting end 137 is coupled to the mounting flange 134, via welding, adhesives, rivets, etc. or maybe integrally formed with the mounting flange 134. The body section 138 extends along the axis A8, which is substantially parallel to a bottom surface of the track 56 (FIG. 1). The body section 138 as a length L1, which is defined between the first, coupling end 136 and the second, mounting end 137. The length L1 is sized such that the front lower fender 100 is positioned a distance D1 away from the track 56 (FIG. 3) so that the front lower fender 100 does not interfere with the turning or movement of the track 56 during the operation of the tractor 14.

The mounting flange 134 is coupled to the second mounting end 137 of the mounting rod 133. The mounting flange 134 is composed of a metal or metal alloy, such as steel, and is formed via casting, forging, stamping, machining, etc. The mounting flange 134 is substantially rectangular, and is sized to be coupled to the undercarriage frame 78. The mounting flange 134 defines a plurality of bores 134a, which receive a respective one of the mechanical fasteners 135 to couple the mounting flange 134 to the undercarriage frame 78. In one example, the mechanical fasteners 135 comprise bolts; however, any suitable fastening mechanism may be employed, such as rivets, screws, etc.

The plurality of fender flanges 126 couple the mounting rod 133 to the bottom surface 118 of the front lower fender 100. Each of the plurality of flanges 126 may be composed of a metal or metal alloy, and may be cast, forged, stamped, etc. Each of the plurality of flanges 126 include a pair of legs coupled to a base to define a generally hat shape. The legs of each respective flange 126 is positionable in one of the pair of fastening recesses 124 for coupling the mounting rod 133 to the front lower fender 100. Each leg defines a bore 139, which is coaxially aligned with the bores of the respective pair of fastening recesses 124 to receive a mechanical fastener for coupling the flange 126 to the respective pair of fastening recesses 124 (FIG. 5).

In one example, with reference to FIG. 4, the front upper fender 102 includes an upper fender body 140 and an upper fender support structure 142. In one example, the upper fender body 140 is composed of a polymer-based material and is formed via rotational molding. It should be noted, however, that the upper fender body 140 may be composed of any suitable material and may be formed using any desired technique, including, but not limited to, casting, injection molding, three-dimensional printing, etc.

The upper fender body 140 has the upper fender width UFW that is measured from a first or inboard upper fender edge 144 to an opposite second or outboard upper fender edge 146. The lower fender body 104 also includes a first or forward upper body section 148, a second or middle upper body section 150 and a third or aft upper body section 152. The forward upper body section 148 extends from a first body end 154 to an opposite second body end 156 between the inboard upper fender edge 144 and the outboard upper fender edge 146. The first body end 154 defines a first end of the front upper fender 102. The forward upper body section 148 extends at a second angle to the second upper body section 150. Stated another way, the forward upper body section 148 extends along an axis A3 that is substantially oblique to an axis A4 along which the second upper body section 150 extends. By extending at the second angle, the forward upper body section 148 of the front upper fender 102 assists in inhibiting dirt or other debris from accumulating on the cab 40 of the tractor 14, and in one example, reduces an accumulation of mist or other moisture on a windshield of the cab 40 when the tractor 14 traverses over a wet surface.

The middle upper body section 150 extends from a third body end 158 to an opposite fourth body end 160 between the inboard upper fender edge 144 and the outboard upper fender edge 146. The third body end 158 is coupled to or integrally formed with the second body end 156 of the forward upper body section 148. The middle upper body section 150 is substantially planar to cover an uppermost portion of the track 56 (FIG. 1) and assists in inhibiting dirt or other debris from accumulating on the cab 40 of the tractor 14.

The aft upper body section 152 extends from a fifth body end 162 to an opposite sixth body end 164 between the inboard upper fender edge 144 and the outboard upper fender edge 146. The fifth body end 162 is coupled to or integrally formed with the fourth body end 160 of the middle upper body section 150. The sixth body end 164 defines a second end of the front upper fender 102. The aft upper body section 152 extends at a third angle to the middle upper body section 150. Stated another way, the aft upper body section 152 extends along an axis A5 that is substantially oblique to the axis A4 along which the middle upper body section 150 extends. By extending at the third angle, the aft upper body section 152 of the front upper fender 102 also assists in inhibiting dirt or other debris from accumulating on the cab 40 of the tractor 14.

The upper fender body 140 of the front upper fender 102 also includes a first or top surface 166 and an opposite second or bottom surface 168. The top surface 166 is substantially smooth; however, the top surface 166 may include one or more ribs or other features for aesthetics. In one example, the top surface 166 may include a substantially triangularly shaped recess on the aft upper body section 152 for aesthetics. It should be understood, however, that the top surface 166 may include other aesthetically pleasing features or may be substantially smooth.

The bottom surface 168 receives a portion of the upper fender support structure 142. In one example, with reference to FIG. 5A, the bottom surface 168 includes an upper coupling channel 170 that is defined about a perimeter of a central base 172, and the plurality of pairs of fastening recesses 124. Generally, the bottom surface 168 includes four pairs of fastening recesses 124 spaced apart about a perimeter of the central base 172, which are each configured to receive a respective end of one of the plurality of fender flanges 126. By including four pairs of fastening recesses 124 on the upper fender body 140, the upper fender body 140 of the front upper fender 102 may be used on both the right side 14b (FIG. 1) and the left side 14a (FIG. 2) of the tractor 14. The plurality of flanges 126 couple the upper mounting rod 176 to the bottom surface 168 of the front upper fender 102. Generally, the legs of each respective flange 126 is positionable in one of the pair of fastening recesses 124 for coupling the upper mounting rod 176 to the front upper fender 102 (FIG. 5A).

The upper coupling channel 170 is recessed relative to the bottom surface 168 to define a channel or groove that receives as portion of the upper fender support structure 142. The upper coupling channel 170 is substantially annular and has a substantially U-shaped cross-section; however, the upper coupling channel 170 may have any desired shape that corresponds with the portion of the upper fender support structure 142. Generally, the upper coupling channel 170 and the central base 172 are defined on the bottom surface 168 of the front upper fender 102 near or adjacent to the second body end 156, and extends along the middle upper body section 150 to be near or adjacent to the sixth body end 164 of the aft upper body section 152. The central base 172 is substantially elliptical, but the central base 172 may have any desired shape.

In certain instances, the bottom surface 168 also includes one or more recesses 130, which may impart rigidity and provide a mass savings. In addition, the bottom surface 168 may include a lip 174, which extends about the bottom surface 168 of the front upper fender 102 near a perimeter of the front upper fender 102. The lip 174 assists in inhibiting debris from the tracks 56 from accumulating on the cab 40 (FIG. 1).

With reference to FIG. 6, the upper fender support structure 142 is shown exploded from the front upper fender 102 and the saddle assembly 54. In one example, the upper fender support structure 142 includes an upper mounting rod 176, a mounting flange 178, the plurality of flanges 126, and the one or more mechanical fasteners 135 to couple the upper mounting rod 176 to the saddle assembly 54.

The upper mounting rod 176 interconnects the front upper fender 102 with the saddle assembly 54. In one example, the upper mounting rod 176 is composed of a metal or metal alloy, such as a steel. The upper mounting rod 176 may be formed using any suitable technique, including, but not limited to, forging, casting, extruding, machining, etc. The upper mounting rod 176 has a solid cylindrical shape; however, the upper mounting rod 176 may have any desired shape. The upper mounting rod 176 includes a first coupling end 180 and an opposite second, mounting end 182 that are interconnected by a body section 184. In one example, the upper mounting rod 176 is bent or shaped to form the first coupling end 180 and the second mounting end 182. The first coupling end 180 forms a shape that corresponds with a shape of the front upper fender 102, which is sized and shaped to correspond with the upper coupling channel 170 such that the first coupling end 180 may be received within the upper coupling channel 170 (FIG. 6). In this example, the first coupling end 180 has a first segment 180a, a second segment 180b, a third segment 180c and a fourth segment 180d. The first segment 180a defines a terminal end of the upper mounting rod 176 and extends along an axis A12, which is substantially perpendicular to an axis A12 of the third segment 180c. The first segment 180a is coupled to the portion of the upper coupling channel 170 that is associated with the aft upper body section 152 (FIG. 5) of the front upper fender 102. The second segment 180b interconnects the first segment 180a and the third segment 180c, and extends along an axis A13 that is substantially oblique to the axis A12. The second segment 180b is coupled to the portion of the upper coupling channel 170 that is associated with the aft upper body section 152 (FIG. 5) of the front upper fender 102. The third segment 180c is coupled to the fourth segment 180d, and extends along the axis A12, which is substantially parallel to a longitudinal axis L2 of the saddle assembly 54. The third segment 180c is coupled to the portion of the upper coupling channel 170 that is associated with the middle upper body section 150 (FIG. 5) of the front upper fender 102. The fourth segment 180d is coupled to the body section 184, and extends along an axis A14, which is substantially oblique to the axis A12. The fourth segment 180d is coupled to the portion of the upper coupling channel 170 that is proximate the middle upper body section 150 and the forward upper body section 148 (FIG. 5A) of the front upper fender 102.

The second mounting end 182 extends from the body section 184 along an axis A15, which is substantially perpendicular to the longitudinal axis L2 of the saddle assembly 54. The second mounting end 182 is coupled to the mounting flange 178, via welding, adhesives, rivets, etc. or maybe integrally formed with the mounting flange 178. The body section 184 interconnects the first coupling end 180 and the second mounting end 182. In this example, the body section 184 has a first body segment 184a, a second body segment 184b, a third body segment 184c, a fourth body segment 184d, and a fifth body segment 184e. The first body segment 184a extends along an axis that is substantially oblique to the axis A14 of the fourth segment 180d. The second body segment 184b extends along an axis that is substantially oblique to the axis of the first body segment 184a, and substantially parallel to the axis A12 of the first segment 180a. The third body segment 184c is arcuate to guide the upper mounting rod 176 around the front upper fender 102 (FIG. 3). The fourth body segment 184d extends along an axis that is substantially oblique to the axis of the second body segment 184b. The fifth body segment 184e is arcuate to guide the upper mounting rod 176 about the track 56. Thus, in this example, the body section 184 is substantially serpentine in shape to interconnect the first, coupling end 180 with the second, mounting end 182 while providing clearance for the movement of the track 56. The body section 184 as a height H1, which is defined between the first, coupling end 180 and the second, mounting end 182. The height H1 is sized such that the front upper fender 102 is positioned a distance D5 (FIG. 11) away from the track 56 (FIG. 3) so that the front upper fender 102 does not interfere with the turning or movement of the track 56 during the operation of the tractor 14. In one example, D5 ranges from about 30 millimeters (mm) to about 110 millimeters (mm).

The mounting flange 178 is coupled to the second mounting end 182 of the upper mounting rod 176. The mounting flange 178 is composed of a metal or metal alloy, such as steel, and is formed via casting, forging, stamping, machining, etc. The mounting flange 178 is substantially rectangular and is sized to be coupled to the fender mounting platform 88 of the upper flange 90 of the saddle assembly 54. The mounting flange 178 defines a plurality of bores 178a, which receive a respective one of the mechanical fasteners 135 to couple the mounting flange 178 to the saddle assembly 54. In one example, the mechanical fasteners 135 comprise bolts; however, any suitable fastening mechanism may be employed, such as rivets, screws, etc.

Figure 10:
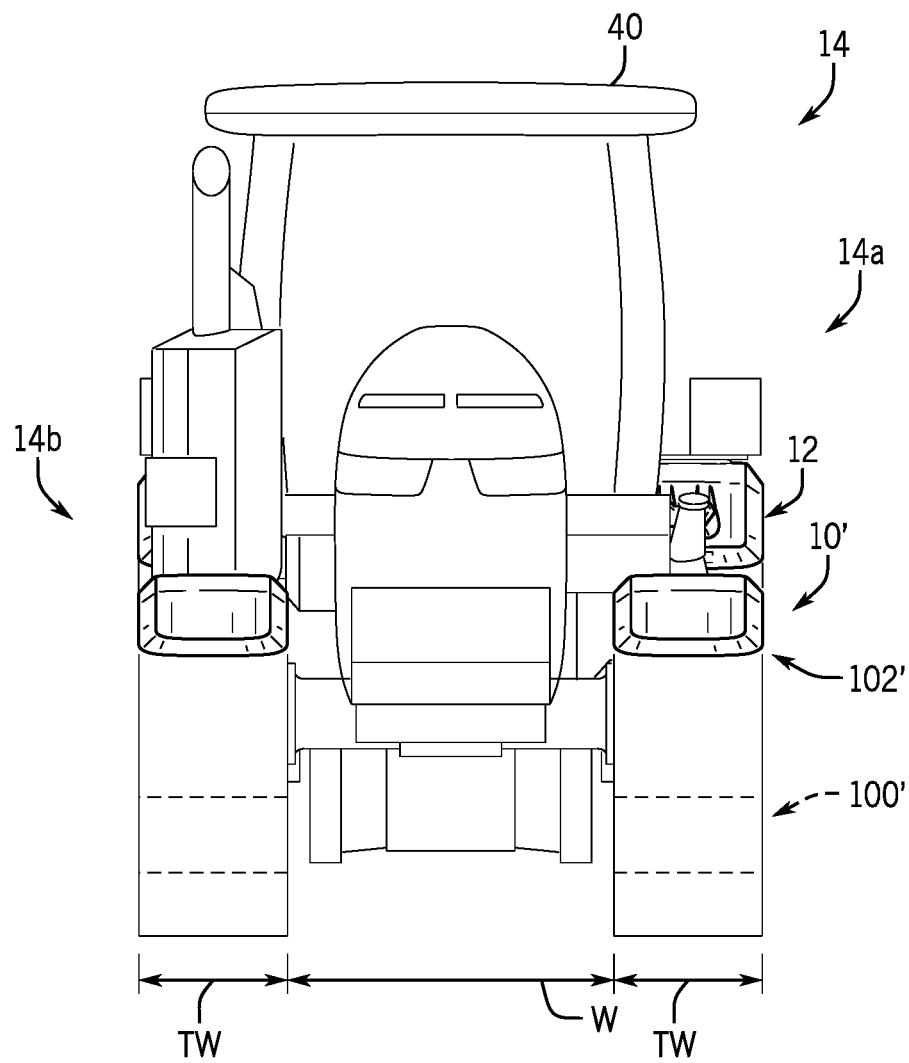
FIG. 10 is a front view of a track tractor having a track with a wide width, in which the track tractor has a narrow track width.

In addition, as the front fender assembly 10 associated with a left side 14a of the tractor 14 is substantially the same as a front fender assembly 10 associated with a right side 14b of the tractor 14, for ease of description, the front fender assembly 10 associated with the right side 14b of the tractor 14 will not be discussed in detail herein and the same reference numerals will be used to denote the same components. Briefly, however, with reference to FIG. 7, the front fender assembly 10 includes the front lower fender 100 and the front upper fender 102. The front lower fender 100 includes the lower fender body 104 and a lower fender support structure 106. The lower fender support structure 106 includes a mounting rod 133, a mounting flange 134, a plurality of fender flanges 126, and the one or more mechanical fasteners 135 to couple the mounting rod 133 to the corresponding undercarriage frame 78 on the right side 14b of the tractor 14. In this example, the mounting rod 133 is a mirror symmetric image of the mounting rod 133 associated with the left side 14a of the tractor 14. The front upper fender 102 includes the upper fender body 140 and an upper fender support structure 142. The upper fender support structure 142 includes an upper mounting rod 176, a mounting flange 178, a plurality of fender flanges 126, and the one or more mechanical fasteners 135 to couple the upper mounting rod 176 to the corresponding saddle assembly 54 associated with the right side 14b of the tractor 14. In this example, the upper mounting rod 176 is a mirror symmetric image of the upper mounting rod 176 associated with the left side 14a of the tractor 14. It should be noted that the front fender assembly 10 for the right side 14b of the tractor 14 is also available to accommodate the wide track system width TW of track 56 (FIG. 10). Thus, the front fender assembly 10 for the right side 14b of the tractor 14 also includes a lower front fender having a body with the lower fender width LFW' of about 24 inches (in.) and a front upper fender having a body with the upper fender width UFW' of about 24 inches (in.) to accommodate a wide width of track 56 of about 24 inches (in.) (FIG. 10).

Figure 7:
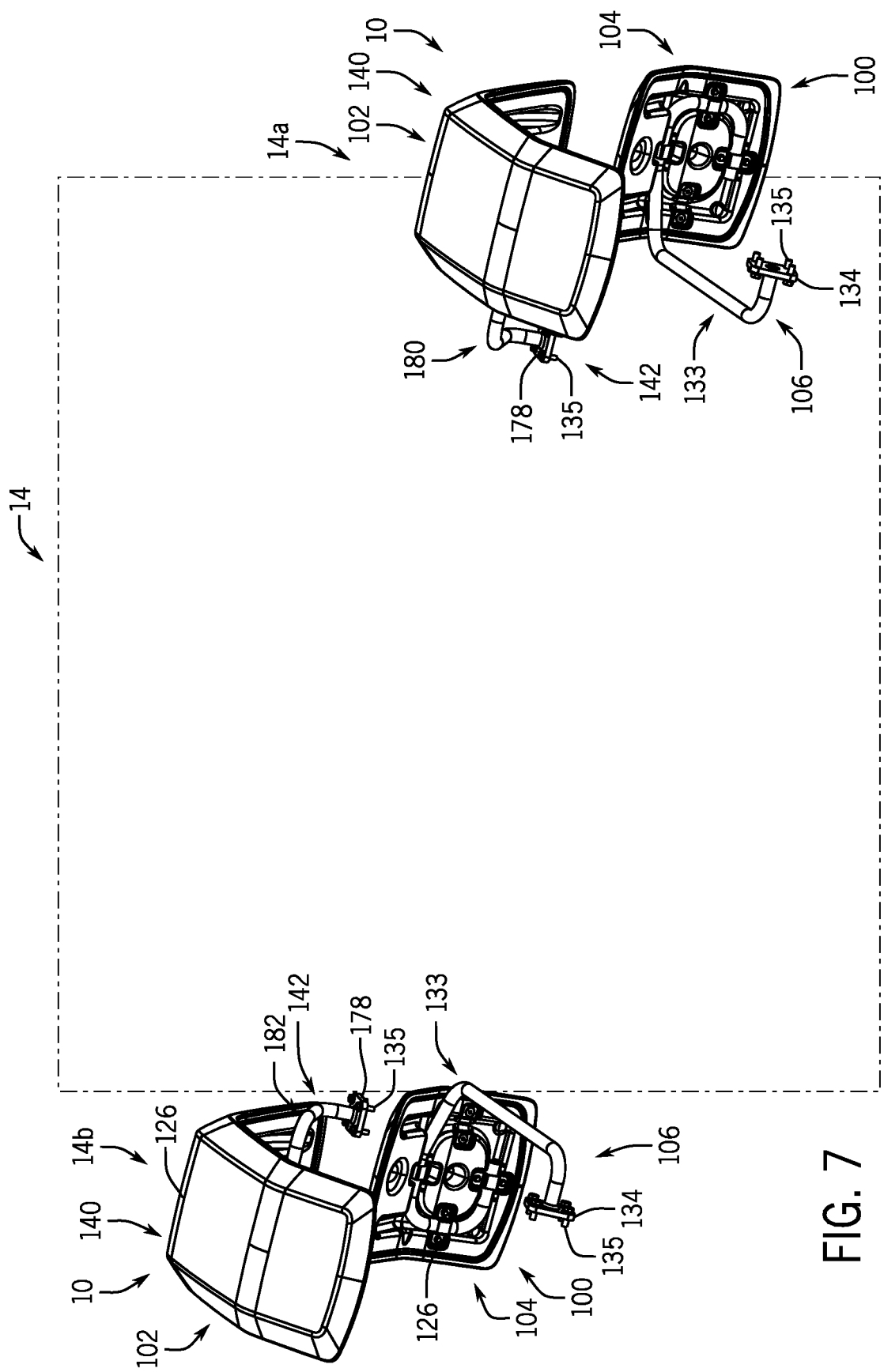
FIG. 7 is a schematic illustration of the front fender assembly for the track tractor of FIG. 1, which shows the front fender assembly associated with the left side and a front fender assembly associated with a right side of the track tractor.

In order to assemble the front lower fender 100, with the mounting rod 133 formed, the mounting flange 134 is coupled to the mounting rod 133, via welding, for example. With reference to FIG. 5, the first coupling end 136 of the mounting rod 133 is positioned within the coupling channel 120. With the flanges 126 formed, each of the flanges 126 are positioned within a respective pair of the fastening recesses 124 and the mechanical fasteners are inserted through the bores of the legs 126a and the threaded bores 128 of the pair of fastening recesses 124 to couple the mounting rod 133 to the lower fender body 104 of the front lower fender 100 to form the front lower fender 100 for the left side 14a of the tractor 14. With reference to FIG. 7, this process is repeated to couple the mounting rod 133 of the lower fender body 104 of the front lower fender 100 associated with the front fender assembly 10 of the right side 14b of the tractor 14.

In order to assemble the front upper fender 102, with the upper mounting rod 176 formed, the mounting flange 178 is coupled to the upper mounting rod 176, via welding, for example. With reference to FIG. 5, the first, coupling end 180 of the upper mounting rod 176 is positioned within the upper coupling channel 170. With the flanges 126 formed, each of the flanges 126 are positioned within a respective pair of the fastening recesses 124 and the mechanical fasteners are inserted through the bores of the legs 126a and the threaded bores 128 of the pair of fastening recesses 124 to couple the upper mounting rod 176 to the upper fender body 140 of the front upper fender 102 to form the front upper fender 102 for the left side 14a of the tractor 14. With reference to FIG. 7, this process is repeated to couple the upper mounting rod 176 of the upper fender body 140 of the front upper fender 102 associated with the front fender assembly 10 of the right side 14b of the tractor 14.

Figure 11:
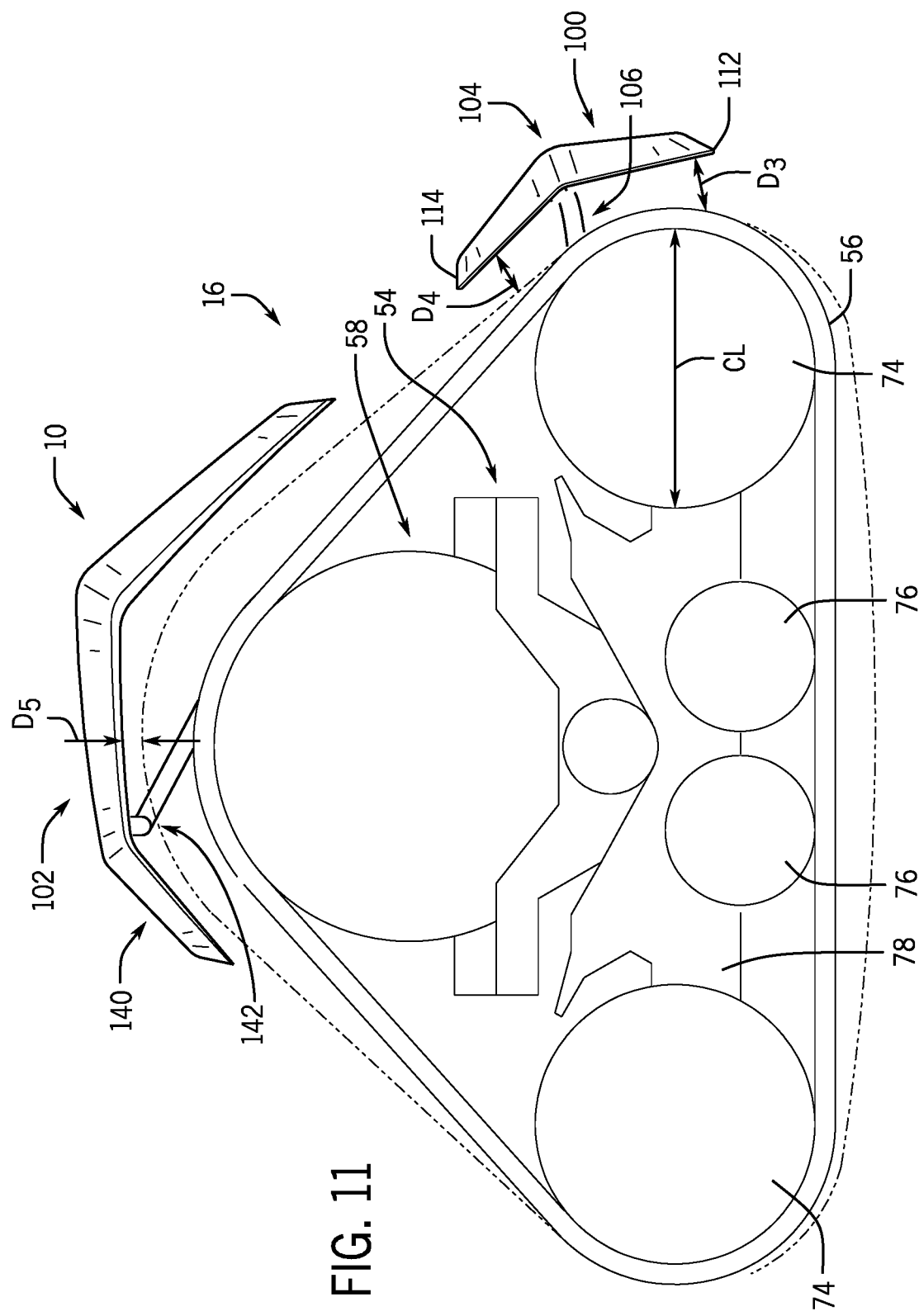
FIG. 11 is a side detail view of the track system of FIG. 3, which illustrates a position of the front fender assembly during an oscillation of the track.

With the front lower fender 100 and the front upper fender 102 assembled, the front lower fender 100 is coupled to the undercarriage frame 78 by inserting the mechanical fasteners 135 through the mounting flange 134 such that the mechanical fasteners 135 threadably engage the plurality of bores 78a of the undercarriage frame 78 to couple the front lower fender 100 to the undercarriage frame 78 associated with the left side 14a of the tractor 14 (FIG. 3). Generally, as shown in FIG. 11, the front lower fender 100 is coupled to the undercarriage frame 78 such that the third lower fender side 112 extends below a centerline CL of the first idler wheel 74. With reference back to FIG. 7, the front upper fender 102 is coupled to the saddle assembly 54 by inserting the mechanical fasteners 135 through the mounting flange 178 such that the mechanical fasteners 135 threadably engage the plurality of bores 88a of the fender mounting platform 88 to couple the front upper fender 102 to the saddle assembly 54 associated with the left side 14a of the tractor 14 (FIG. 3). With the front lower fender 100 and the front upper fender 102 assembled, this process is repeated for the right side 14b of the tractor 14 (FIGS. 1 and 7). The fenders 100' for the wider tractor track width TW may similarly be assembled and installed.

It should be noted that while the front lower fenders 100, 100' are illustrated and described herein as being coupled to an inboard side of the undercarriage frame 78 (i.e. the side of the undercarriage frame 78 facing the cab 40 of the tractor 14), the front lower fender 100, 100' may be coupled to an outboard side of the undercarriage frame 78. In certain instances, it may be desirable to couple the front lower fender 100, 100' to the outboard side of the undercarriage frame 78 due to crop conditions. Thus, generally, the undercarriage frame 78 may include the plurality of bores 78a on opposite sides, to enable the front lower fender 100, 100' to be coupled to a desired side (inboard or outboard) of the undercarriage frame 78 (FIG. 2).

Figure 8:
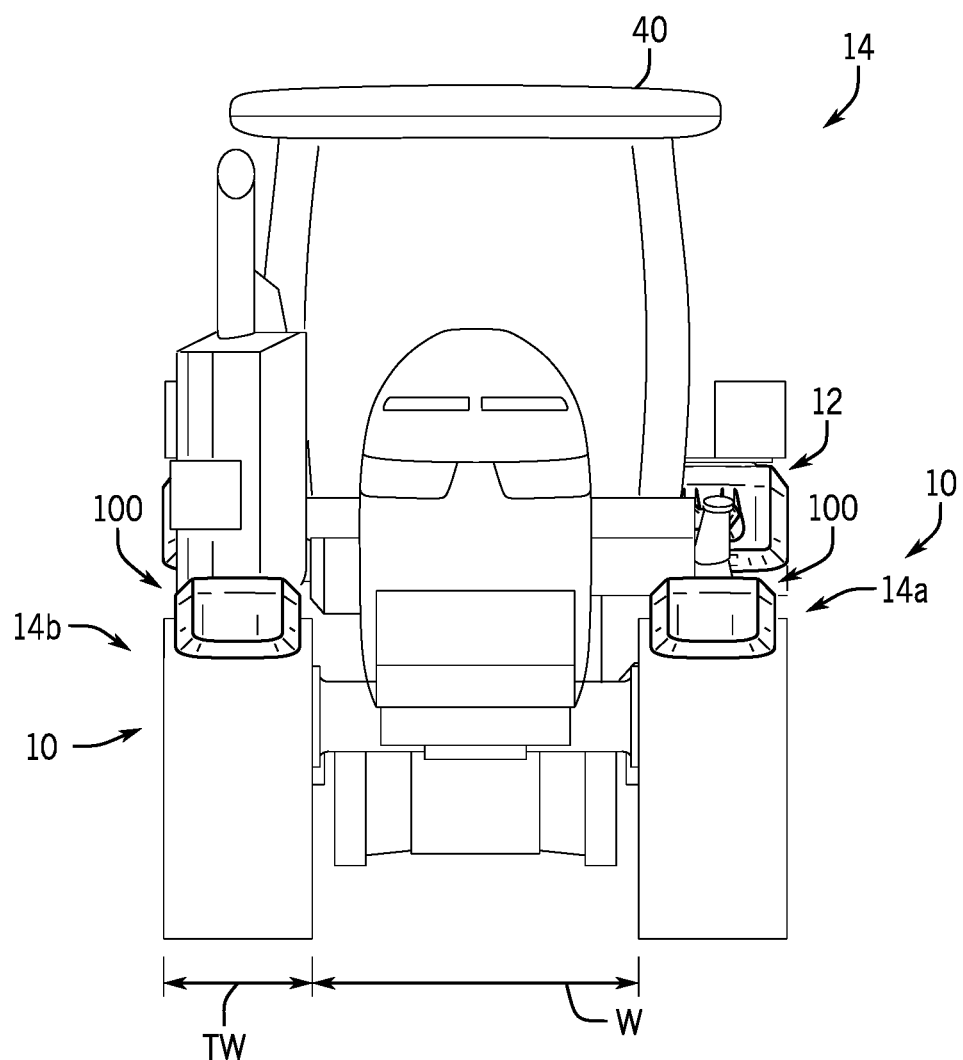
FIG. 8 is a front view of the track tractor of FIG. 1, in which the track tractor has a narrow track width.
Figure 9:
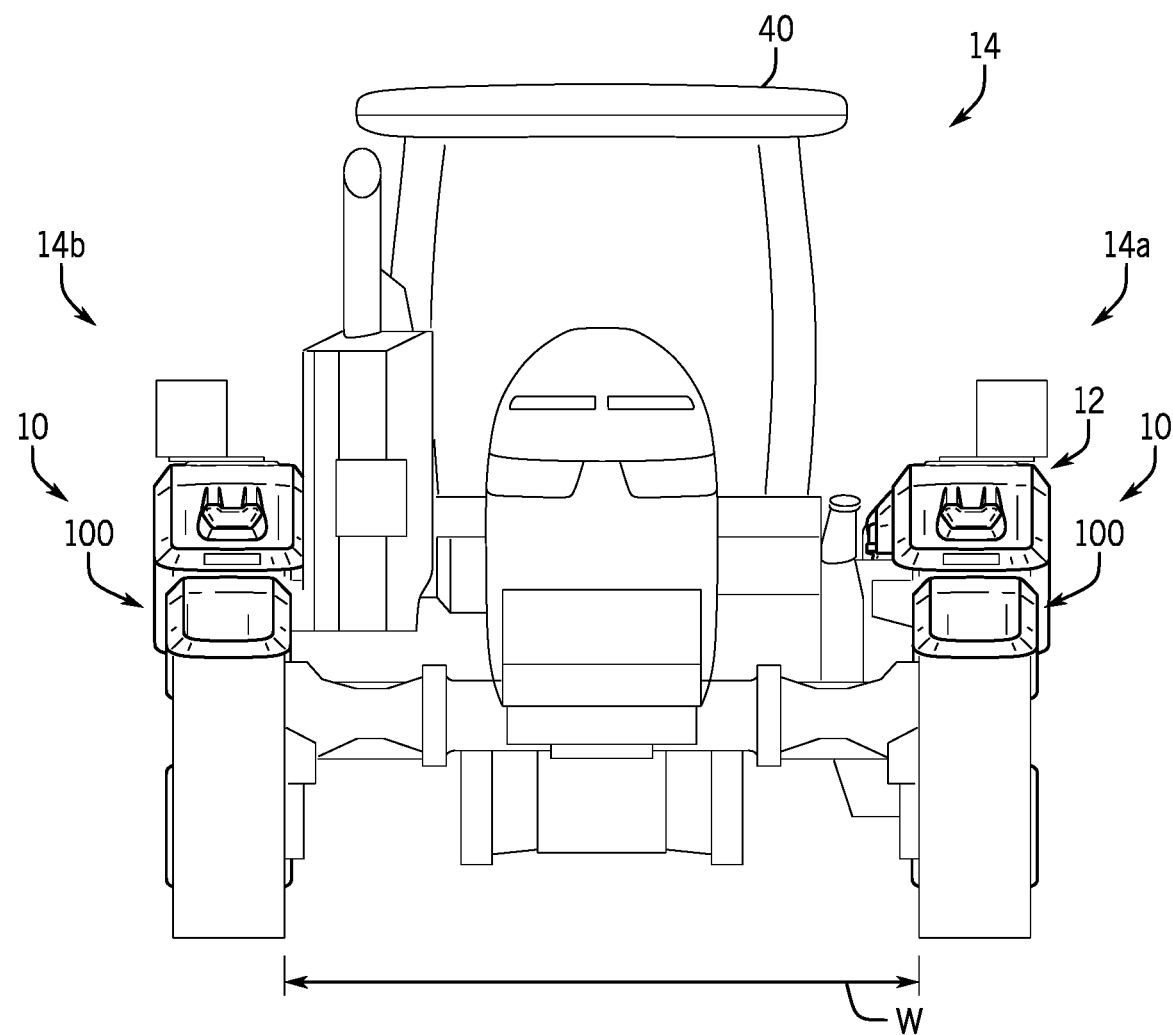
FIG. 9 is a front view of the track tractor of FIG. 1, in which the track tractor has a wide track width.

By coupling the front lower fender 100 only to the undercarriage frame 78 and coupling the front upper fender 102 only to the saddle assembly 54, with reference to FIGS. 8 and 9, a tractor track width W of the tractor 14 may be modified without requiring an adjustment of the front lower fender 100 or the front upper fender 102. In this regard, as the front lower fender 100 and the front upper fender 102 are coupled to the respective track system 16, the front lower fender 100 and the front upper fender 102 move with the track system 16 during an adjustment of the tractor track width W. This improves operator satisfaction and ensures that debris does not accumulate on the cab 40 in any tractor track width W of the tractor 14. Similarly, with reference to FIG. 10, in the example of the tractor 14 having the front fender assembly 10' with the track system width TW of the track 56, the coupling of the front lower fender 100' to the undercarriage frame 78 and coupling the front upper fender 102' to the saddle assembly 54 enables the front lower fender 100' and the front upper fender 102' move with the track system 16 during an adjustment of the tractor track width W.

Moreover, by coupling the front lower fender 100 to the undercarriage frame 78 and coupling the front upper fender 102 to the saddle assembly 54, with reference to FIG. 11, during an oscillation of the track 56 of the track system 16 as the tractor 14 is in motion, a distance D3 and a distance D4 is maintained between the lower fender body 104 of the front lower fender 100 (and also applicable to fender 100'). In one example, the distance D3 is ranges from about 101 millimeters (mm) to about 111 millimeters (mm); and the distance D4 ranges from about 80 millimeters (mm) to about 110 millimeters (mm). This ensures that a clearance is maintained between the lower fender body 104 and the track 56 and inhibits contact between the lower fender body 104 and the track 56 during a movement of the tractor 14. Similarly, during an oscillation of the track 56 of the track system 16 as the tractor 14 is in motion, the distance D5 is maintained between the upper fender body 140 of the front lower fender 100. This ensures that a clearance is maintained between the upper fender body 140 and the track 56 and inhibits contact between the upper fender body 140 and the track 56 during a movement of the tractor 14. In addition, the space defined between the upper fender body 140 and the lower fender body 104 ensures that if the track 56 travels over an uneven surface, the lower fender body 104 does not contact the upper fender body 140.

It will be understood that the front fender assemblies 10, 10' described with regard to FIGS. 1-11 may be variously configured to inhibit the accumulation of debris on the cab 40 of the tractor 14. As indicated with reference to FIGS. 1 and 2, the front fender assembly 10 may have a different configuration with respect to the rear fender assembly 12. Additional details regarding the rear fender assembly 12 will be provided below. In some embodiments, aspects of the front fender assemblies 10, 10' discussed above may be incorporated into the rear fender assembly 12, particularly the addition of a rear lower fender (e.g., similar in construction and configuration to front lower fenders 100, 100').

Figure 12:
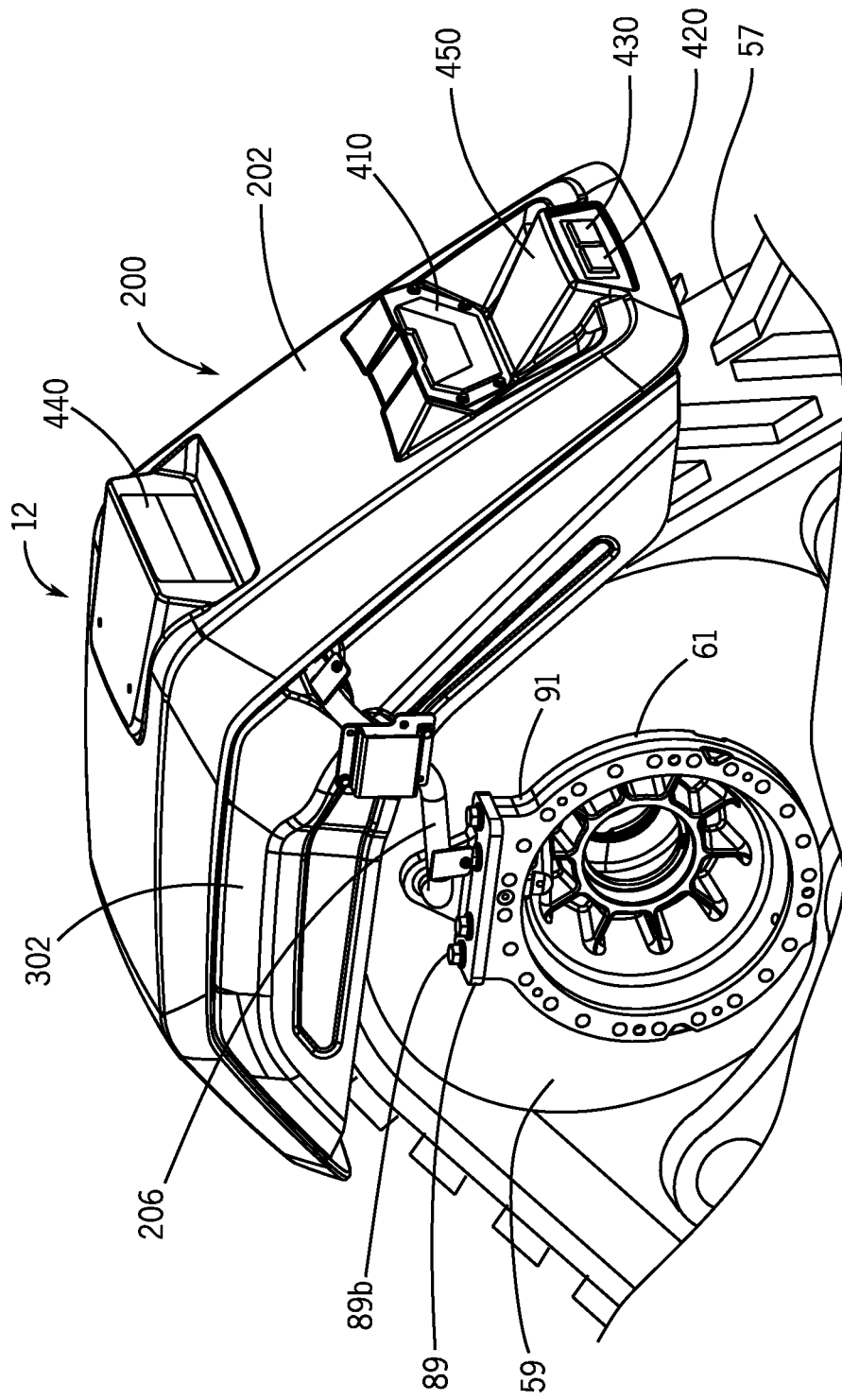
FIG. 12 is a rear perspective view of a track system of the track tractor of FIG. 1 that includes a rear fender assembly for use on the right side of the tractor in accordance with various embodiments.

FIG. 12 is a rear perspective view of a track system 18 of the track tractor 14 of FIG. 1 that includes a rear fender assembly 12 for use on the right side of the tractor 14 in accordance with various embodiments. Generally, and additionally referring to FIG. 2, the track system 18 associated with the rear axle assembly 47 is similar to the track system 16 associated with the front axle assembly 44 discussed above.

As shown in FIG. 12, each of the track systems 18 includes an undercarriage assembly 53, a saddle assembly 55, a track 57 and a drive wheel 59. The drive wheel 59 is fastened to a drive axle shaft (not shown) and supported by an axle housing 61. As above, the drive wheel 59 is annular and defines an outer circumference and a drive wheel hub. The outer circumference of the drive wheel 59 functions to transfer torque from the drive axle shaft (not shown) to the drive wheel 59 and then to the track 57. The drive wheel hub couples the drive wheel 59 to the axle housing 61.

The axle housing 61 is substantially cylindrical and substantially encloses the drive axle shaft (not shown). The axle housing 61 may further includes a saddle flange (not shown) for coupling the saddle assembly 55 to the axle housing 61.

In one example, the undercarriage assembly 53 is movably or pivotally coupled to the saddle assembly 55. Generally, the undercarriage assembly 53 includes a plurality of first idler wheels 75 and a plurality of bogey or second idler wheels 77, which are each supported for rotation relative to an undercarriage frame 79. In this example, the undercarriage assembly 53 includes two pairs of first idler wheels 75 and three pairs of second idler wheels 77. The first and second idler wheels 75, 77 cooperate to guide the track 57 along the ground as it is driven by the drive wheel 59. It should be noted that this configuration of idler wheels 75, 77 is merely exemplary, and any number and arrangement of idler wheels may be employed.

As above, the saddle assembly 55 includes a pair of arms (not shown), each positioned on opposing sides of the drive wheel 59 to guide the track 57 as the track 57 moves about the drive wheel 59.

In one embodiment, the axle housing 61 defines a defines a planar fender mounting platform 89 that extends from an upper flange 91 of the axle housing 61. The upper flange 91 extends outwardly from the top of the outer perimeter of the axle housing 61 on an inboard end, and the fender mounting platform 89 is defined on a top surface of the upper flange 91. As will be discussed, the rear fender 200 of the rear fender assembly 12 is coupled to the fender mounting platform 89 with a rear fender support structure 206. Generally, the fender mounting platform 89 defines a plurality of bores for receipt of a plurality of mechanical fasteners 89b to couple the rear fender support structure 206, and thus the rear fender 200, to the axle housing 61.

The track 57 is continuous and tensioned to be received about a perimeter of the drive wheel 59 and the undercarriage assembly 53. Similar to the track 56 of the front tracks 56, the rear track 57 has a track system width TW that is measured from one side of to an opposite side.

As described in greater detail below, the rear fender assembly 12 may be configured to accommodate relatively wide and narrow track system widths TW and relatively wide and narrow tractor track widths W. Generally, other than track system width TW, the wider embodiments of the rear fender assembly 12 are substantially the same as the narrower embodiments.

As partially depicted in FIG. 12 and introduced above, the rear fender assembly 12 includes the rear fender 200 and the rear fender support structure 206 that couples the rear fender 200 to the axle housing 61 of the track system 18. In one example, the rear fender 200 may include a primary rear fender body 202 and a side or secondary fender body 302 that is fastened to one side of the primary rear fender body 202.

In a similar manner to the front fenders 100, 102, the rear fender 200 operates to prevent or mitigate mud and debris from accumulating on the cab 40. Additionally, the rear fender 200 supports a number of accessories 400, 410, 420, 430, 440, 450 that may be considered part of the rear fender assembly 12. For example, a first or front light 400 (not shown in FIG. 12) may be arranged on a forward portion of the rear fender 200. A second or rear light 410 may be arranged on a rear or aft portion of the rear fender 200. One or more switches 420, 430, such as select control valve (SCV) switches 420 and hitch switches 430, may be arranged on the rear or aft portion of the rear fender 200. Additionally, various types of reflectors 440 may be positioned in any suitable location on the rear fender 200.

The rear fender 200 is described in greater detail with reference to FIGS. 13-18, which are perspective, front, rear, top, and bottom views of the rear fender 200 removed from the assembly 12. In the views of FIG. 13-18, the rear fender 200 may be incorporated into a left side rear fender assembly 12.

As shown, the primary rear fender body 202 may be considered to include a forward edge 210, an aft edge 212, an inboard side edge 214, and an outboard side edge 216. The primary rear fender body 202 may also be considered to include one or more body sections 220, 222, 224 that extend at angles relative to one another. In particular, a first or forward body section 220 extends from a second or middle body section 222 at a transition 226, and a third or aft body section 224 extends from the middle body section 222 at a transition 228. The body sections 220, 222, 224 may be considered generally planar with longitudinal axes A20, A22, A24 oriented at angles relative to one another. For example, the longitudinal axis A20 of the forward body section 220 is obliquely angled relative to the longitudinal axis A22 of the middle body section 222, and similarly, the longitudinal axis A24 of the aft body section 224 is obliquely angled relative to the longitudinal axis A22 of the middle body section 222. The lower or interior angle between axis A20 and axis A22 may be the same or different than the lower or interior angle between axis A24 and axis A22. In this manner, the downwardly extending forward and aft body sections 220, 224 assist in inhibiting dirt or other debris from accumulating on the cab 40 of the tractor 14.

Additionally, the edges 210, 212, 214, 216 may be chamfered about the perimeter of the primary rear fender body 202 to collectively form a lip. In other words, the edges 210, 212, 214, 216 may be angled downward relative to the corresponding body section(s) 220, 222, 224. This further assists in inhibiting dirt or other debris from accumulating on the cab 40 of the tractor 14.

The primary rear fender body 202 may further be considered to include a top surface 230 and an opposite bottom surface 250, each formed on one or more of the body sections 220, 222, 224. The top surface 230 is generally smooth; however, the top surface 230 may include one or more ribs or other features for aesthetics. Additionally, in one example, the top surface 230 may have one or more cut outs, recesses, projections, and the like to accommodate various accessories on the primary rear fender body 202, as discussed in greater detail below. As also discussed in greater detail below, the bottom surface 250 is configured to receives a portion of the rear fender support structure 206, as well as a wiring harness 460, each of which are discussed below and omitted from FIGS. 13-18 for clarity.

As shown, the side rear fender body 302 is coupled to the inboard side edge 214 of the primary rear fender body 202. In one example, the side rear fender body 302 at least partially has the same shape and/or length of the primary rear fender body 202. In other words, the side rear fender body 302 extends along the forward, middle, and aft body sections 220, 222, 224. In one example, the side rear fender body 302 is generally L-shaped in cross-section and may be considered to be formed by a mounting flange 310 and an extension flange 320. The mounting flange 310 may extend in one or more planes that are generally parallel to the respective forward, middle, and aft body sections 220, 222, 224 along the length of the of the side rear fender body 302. As described in greater detail below, during assembly, the upper surface of the mounting flange 310 is fastened to the bottom surface 250 of the primary rear fender body 202 to secure the side rear fender body 302 to the primary rear fender body 202.

The extension flange 320 of the side rear fender body 302 extends at an angle relative to the mounting flange 310 in a lateral orientation. In one embodiment, the angle of the extension flange 320 is approximately the same as the angle of the inboard side edge 214 relative to the respective the forward, middle, and aft body sections 220, 222, 224. In this manner, the side rear fender body 302, particularly the extension flange 320, provides a functional extension of the inboard side edge 214 of the primary rear fender body 202. As a result, the side rear fender body 302 functions to further assist and/or inhibit dirt from accumulating on the tractor 14.

Figure 13:
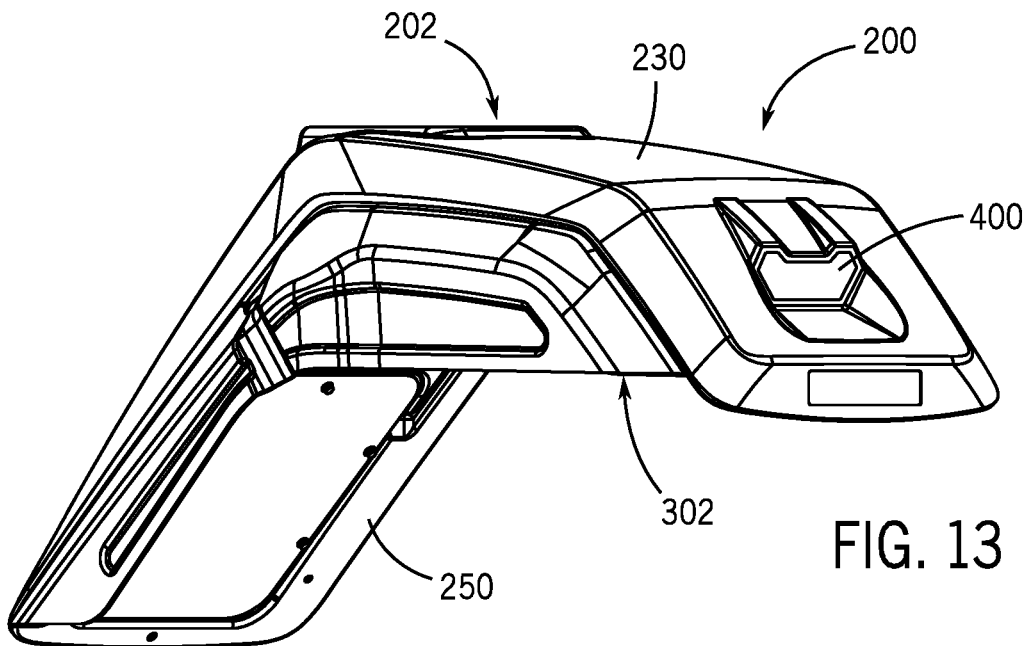
FIG. 13 is a front perspective view of a rear fender for use on the left side of the tractor of FIG. 1.
Figure 14:
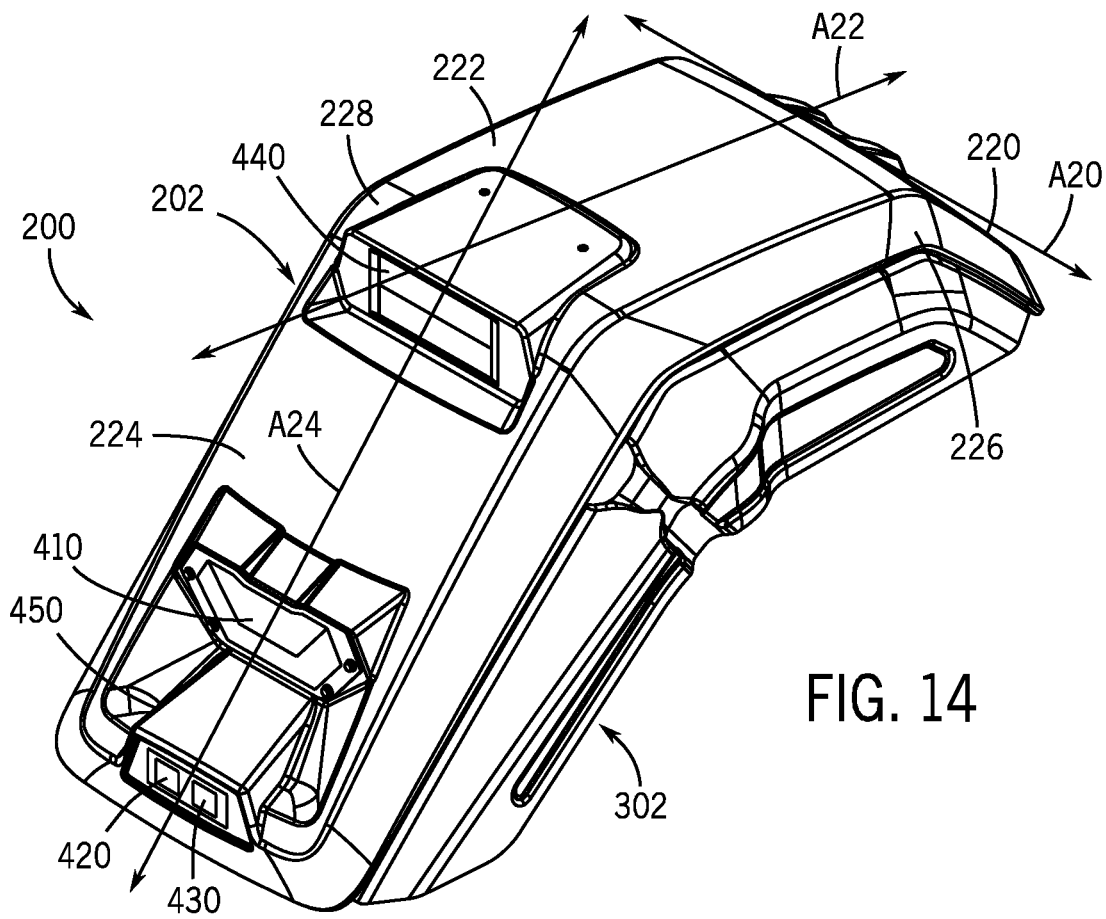
FIG. 14 is a rear perspective view of a rear fender for use on the left side of the tractor of FIG. 1.
Figure 15:
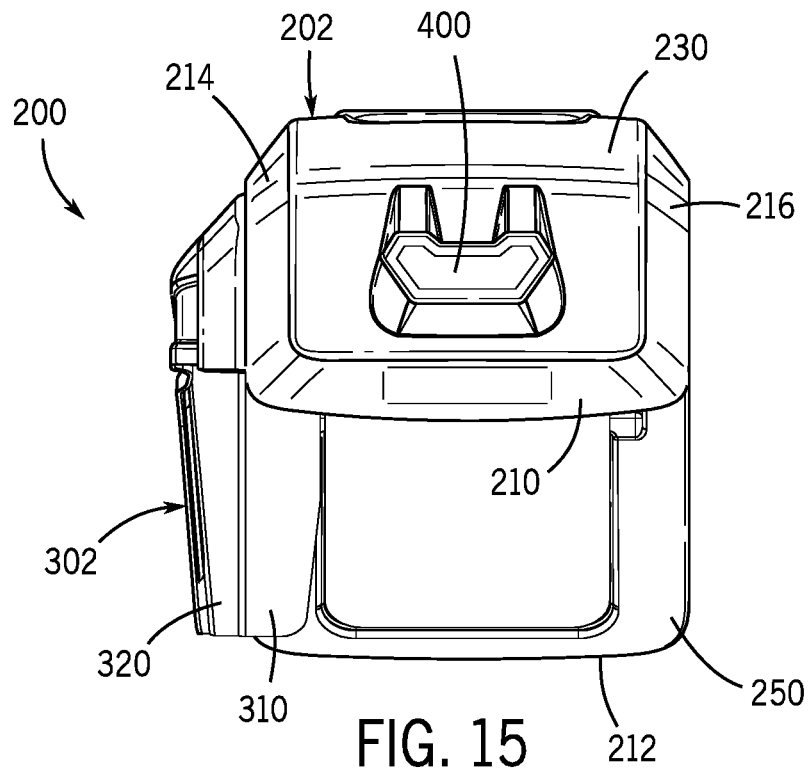
FIG. 15 is a front view of the rear fender for use on the left side of the tractor of FIG. 1.
Figure 16:
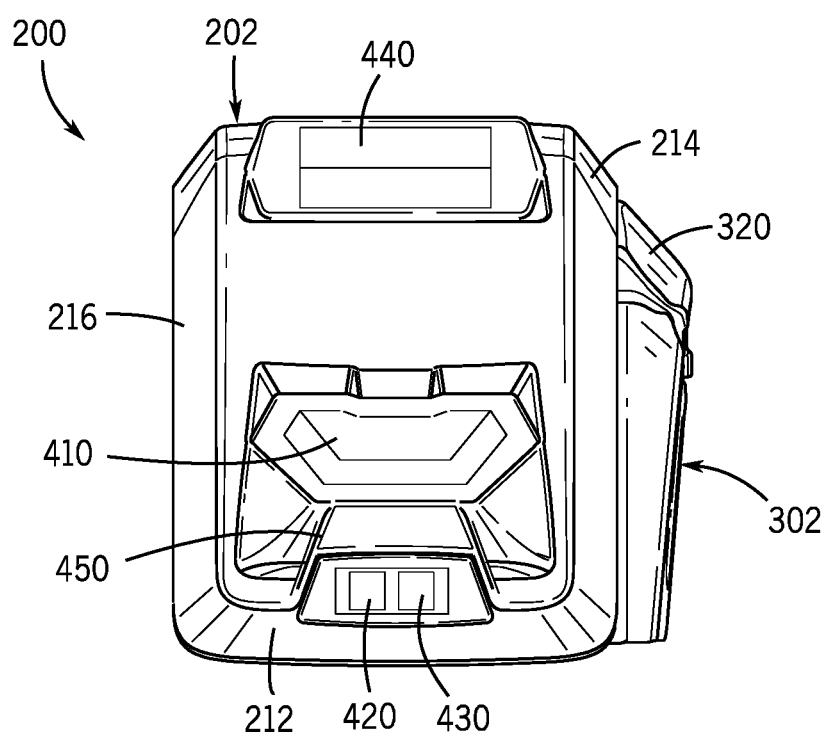
FIG. 16 is a rear view of the rear fender for use on the left side of the tractor of FIG. 1.

In one example, the side rear fender body 302 (e.g., as shown in FIGS. 15 and 16) for a left side rear fender assembly 12 is a mirror image to the corresponding side rear fender body 302 (e.g., as shown in FIG. 13) for a right side rear fender assembly 12. In this manner, identical primary rear fender bodies 202 may be manufactured, and subsequently, left side and right side rear fender bodies 302 may be provided and attached to the respective inboard sides of the primary rear fender bodies 202 to form each side of the rear fender assemblies 12. Additional details regarding the side rear fender body 302 and other aspects of the rear fender assembly 12 are provided below.

Figure 18:
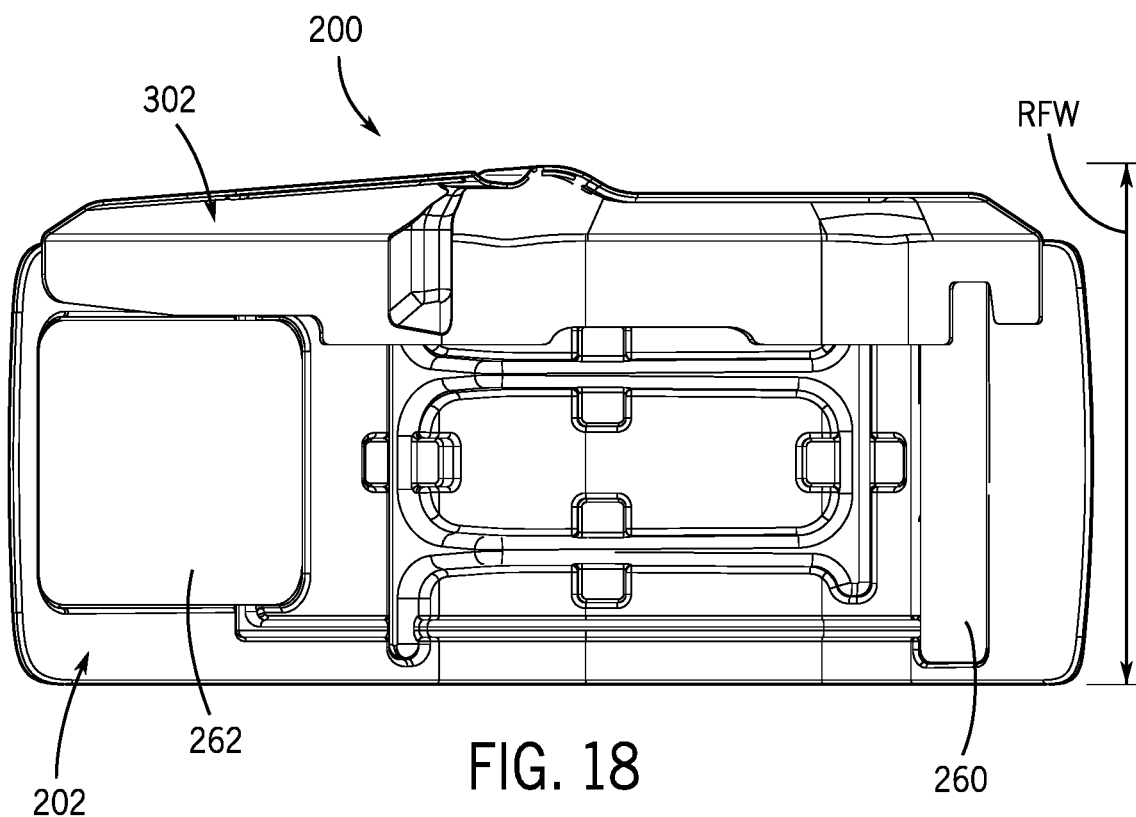
FIG. 18 is a bottom view of the rear fender for use on the left side of the tractor of FIG. 1.

As best shown in FIG. 18, the rear fender 200 may further include one or more underside panels 260, 262 attached to the bottom surface 250 of the primary rear fender body 202. As described in greater detail below, the underside panels 260, 262 may operate to protect portions of the wiring harness 460.

Figure 17:
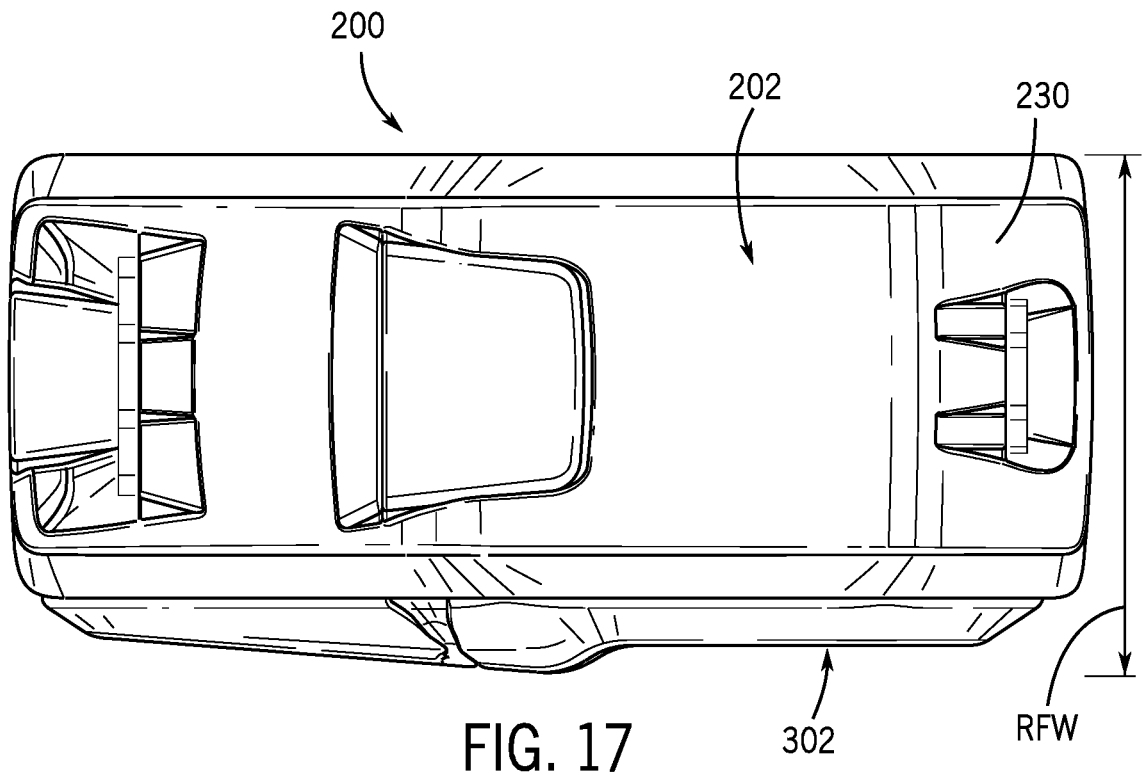
FIG. 17 is a top view of the rear fender for use on the left side of the tractor of FIG. 1.
Figure 19:
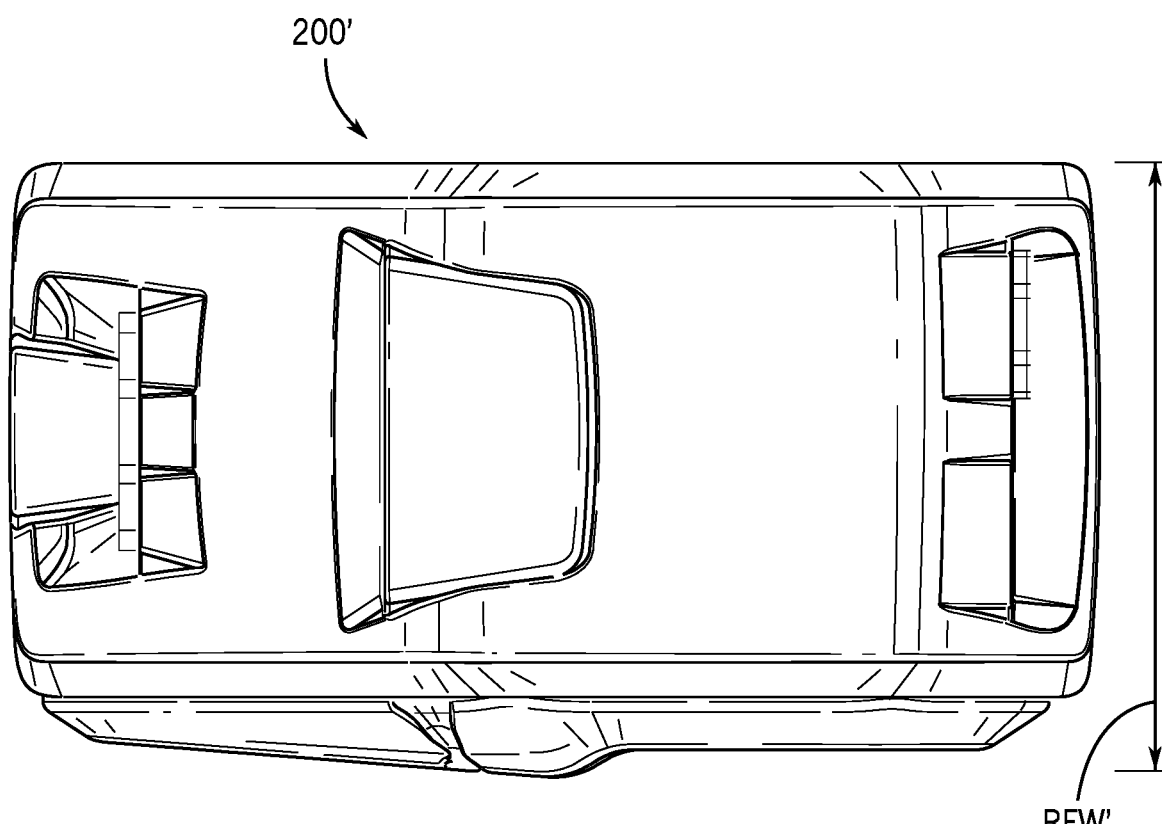
FIG. 19 is a top view of a rear fender for use on the left side of the tractor of FIG. 1 in accordance with a further embodiment.

As best shown in FIGS. 17 and 18, the rear fender 200 may have a rear fender width RFW extending between the inboard extent of the side rear fender body 302 and the outboard extent of the primary rear fender body 202. In this example, the width RFW may accommodate and completely cover in a lateral orientation relatively narrow tracks (e.g., track 57 of FIG. 12). As one example, the width RFW may be approximately 24 inches (in.). Other widths may be provided in fender configurations that are otherwise identical to the rear fender 200 described herein. For example, FIG. 19 is a top view of a rear fender 200' with a width RFW' that may accommodate and completely cover in a lateral orientation a relatively wide track. As one example, the width RFW' may be approximately 30 inches (in.). Other example widths of the rear fenders may include, for example, 16.5 inches (in.), 18 inches (in.), or any suitable width.

Figure 20:
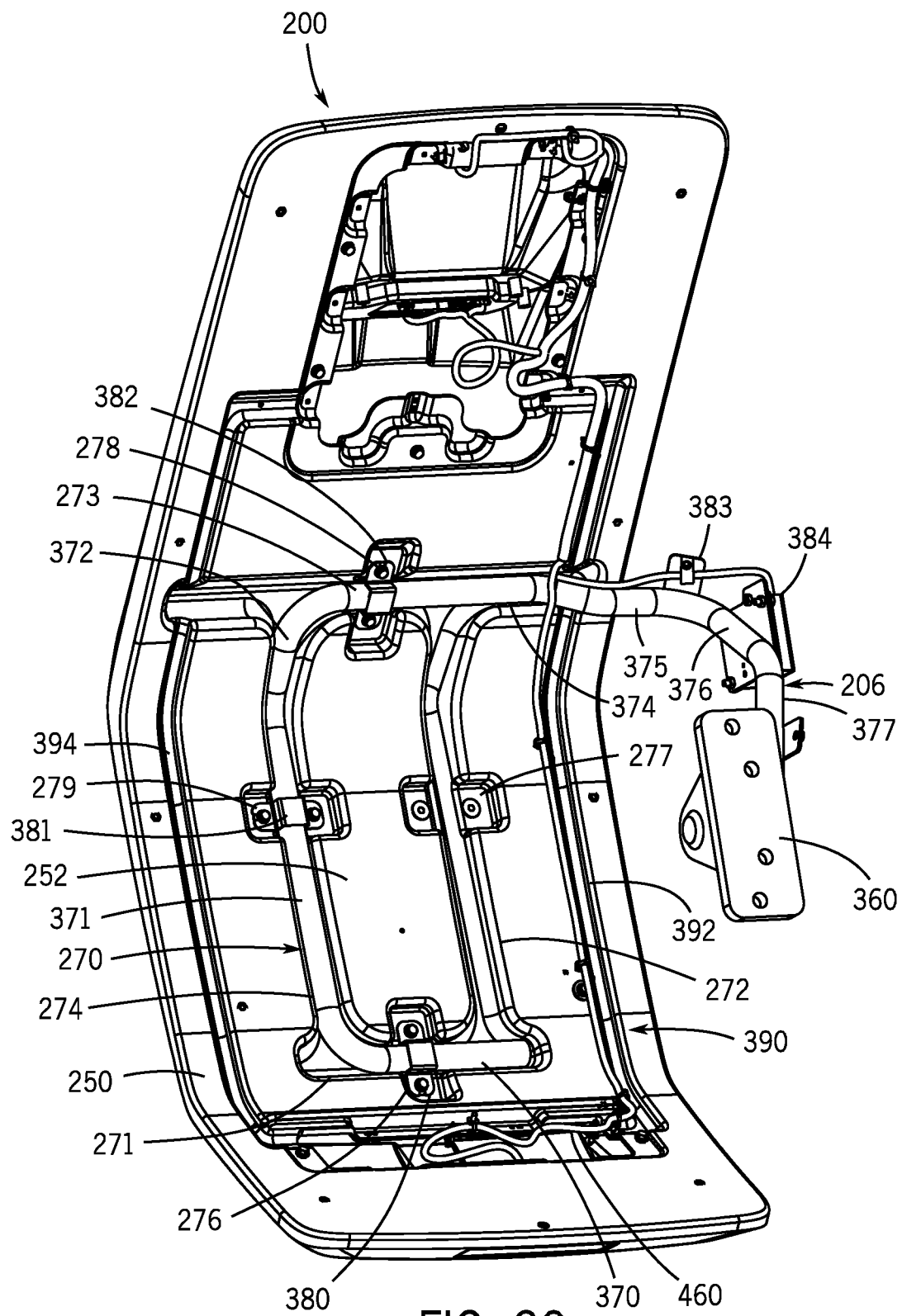
FIG. 20 is a bottom perspective view of a portion of the rear fender assembly for use on the left side of the tractor of FIG. 1.

With reference to FIG. 20, the rear fender 200 is shown with the side rear fender body 302 and underside panels 260, 262 removed to better describe the bottom surface 250 of the primary rear fender body 202. As shown, the bottom surface 250 includes a support structure coupling channel 270 that is defined about a perimeter of a central base 252 with a forward portion 271, inboard side portion 272, aft portion 273, and outboard side portion 274. A respective fastening recess 276, 277, 278, 279 is formed in approximately the center of each of the portions 271-274 of the support structure coupling channel 270. As described in greater detail below, the support structure coupling channel 270 is generally U-shaped and functions to accommodate the support structure 206, thereby enabling the support structure 206 to be fastened to the primary rear fender body 202 such that the rear fender assembly 12 may be coupled to the track system 18.

The bottom surface 250 of the primary rear fender body 202 is also provided with a wiring harness channel 390 to accommodate a wiring harness 460 that supplies power and/or signals to positions on the rear fender 200. As shown in FIG. 20, the wiring harness channel 390 includes an inboard side portion 392 and an outboard side portion 394. In one example, either of the inboard side portion 392 or the outboard side portion 394 may be omitted. However, the combination of the inboard side portion 392 and the outboard side portion 394 enables the primary rear fender body 202 to be utilized for both sides of the tractor 14. In any event, the inboard side portion 392 and outboard side portion 394 extend along at least a portion of the length of the primary rear fender body 202, particularly between the various locations of the accessories 400, 410, 420, 430, 450 that require signals and/or power from the wiring harness 460.

Figure 21:
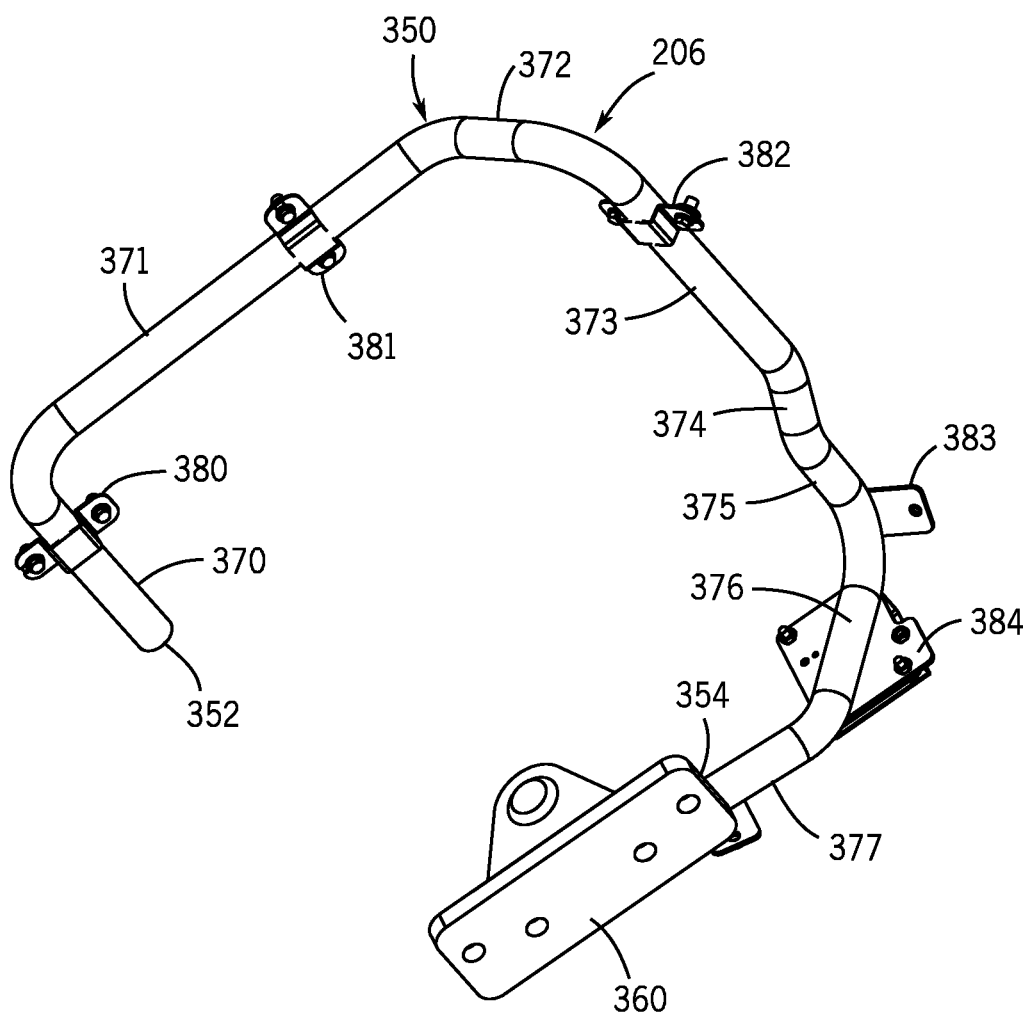
FIG. 21 is a bottom perspective view of a rear fender support structure that may be incorporated into the rear fender assembly of FIG. 12.

With reference to FIG. 21, the rear fender support structure 206 is shown removed from the rear fender 200 and the rear track system 18. In one example, the rear fender support structure 206 includes a mounting rod 350, a mounting flange 360, and one or more fender flanges 380, 381, 382, 383, 384 that cooperate to attach the rear fender 200 to the axle housing 61 of the rear track system 18. In one example, the mounting rod 350 is composed of a metal or metal alloy, such as a steel. The mounting rod 350 has a solid cylindrical shape; however, the mounting rod 350 may have any desired shape.

Now referring to both FIGS. 20 and 21, the mounting rod 350 extends between a first end 352 and an opposite second end 354 and includes a number of support segments 370, 371, 372, 373, 373, 374, 375, 376, 377 that are bent relative to one another and extend sequentially from the first end 352 to the second end 354. In one example, the first, second, third, and fourth support segments 370-373 are arranged relative to one another to form a substantially C-shape configuration as a mounting end that is sized and shaped to correspond with portions of the support structure coupling channel 270.

In one example, the first support segment 370 is generally coplanar with the middle body section 222, extends perpendicularly to the axis A22, and is positioned within the forward portion 271 of the support structure coupling channel 270. The second support segment 371 is perpendicular to the first support segment 370, generally coplanar with the middle body section 222, extends parallel to the axis A22, and is positioned within the outboard side portion 274 of the support structure coupling channel 270. The third support segment 372 is angled relative the second support segment 371, generally coplanar with the aft body section 224, extends parallel to the axis A24, and is positioned within the outboard side portion 274 of the support structure coupling channel 270. The fourth support segment 373 is perpendicular to the third support segment 372, generally coplanar to the aft body section 224, perpendicular to the axis A24, and is positioned within the aft portion 273 of the support structure coupling channel 270.

The fifth support segment 374 of the support structure 206 extends at an angle to the fourth support segment 373 and off the bottom surface 250. Similarly, the sixth support segment 375 extends at an angle to the fifth support segment 374, off the bottom surface 250, and although not shown in FIG. 20, may be generally coplanar to the mounting flange 310 of the side rear fender body 302 upon assembly. The seventh support segment 376 extends at an angle to the sixth support segment 375, off the bottom surface 250, and although not shown in FIG. 20, may be generally coplanar to the extension flange 320 of the side rear fender body 302 upon assembly. Finally, the eighth support segment 377 extends at an angle to the seventh support segment 376 to the second mounting rod end 354. In one example, the eighth support segment 377 is generally parallel to the axis A22 of the middle body section 222 and extends to the second end 354. The second end 354 is coupled to the mounting flange 134, via welding, adhesives, rivets, etc., or is integrally formed with the mounting flange 360.

The mounting flange 360 is composed of a metal or metal alloy, such as steel, and is formed via casting, forging, stamping, machining, etc. The mounting flange 360 is substantially rectangular and is sized to be coupled to the axle housing 61. The mounting flange 360 defines a plurality of bores configured to receive mechanical fasteners to couple the mounting flange 360 to the axle housing 61. In one example, the mechanical fasteners are bolts; however, any suitable fastening mechanism may be employed, such as rivets, screws, etc.

Generally, the support segments 374, 375, 376, 377 have lengths that provide a suitable distance between all areas of the rear fender 200 and the track 57 upon installation to avoid interference with turning or movement during operation. In one example, the support structure 206 and rear fender 200 cooperate to maintain a distance from the track 57 at about 30 millimeters (mm) to about 110 millimeters (mm).

The fender flanges 380-384 are positioned along the mounting rod 350 and function to couple the mounting rod 350 to the rear fender 200. Each of the plurality of fender flanges 380-384 may be composed of a metal or metal alloy, and may be cast, forged, stamped, etc. The fender flanges 380-384 may take any suitable form, such as being formed with one or more legs extending from one or both sides of the respective fender flange 380-384 and shaped to mate or attach in an appropriate location.

A first fender flange 380 is arranged on the first support segment 370; a second fender flange 381 is arranged on the second support segment 371; and a third fender flange 382 is arranged on the fourth support segment 373. During assembly, the first, second, and third fender flanges 380-382 are positioned to be received within fastening recesses 276, 279, 278, respectively. The fender flanges 380-382 are fastened to the rear fender 200 in the respective recesses 276, 279, 278 in any suitable manner, such as by bolts, rivets, or fasteners. The fourth fender flange 383 is positioned on the sixth support segment 375. The fourth fender flange 383 may provide a mounting surface for the wiring harness 460. In some examples, the fourth fender flange 383 may be fastened to the side rear fender body 302. The fifth fender flange 384 is positioned on the seventh support segment 376. The fifth fender flange 384 may also provide a mounting surface for the wiring harness 460. In some examples, the fifth fender flange 384 may also be fastened to the side rear fender body 302.

Figure 22:
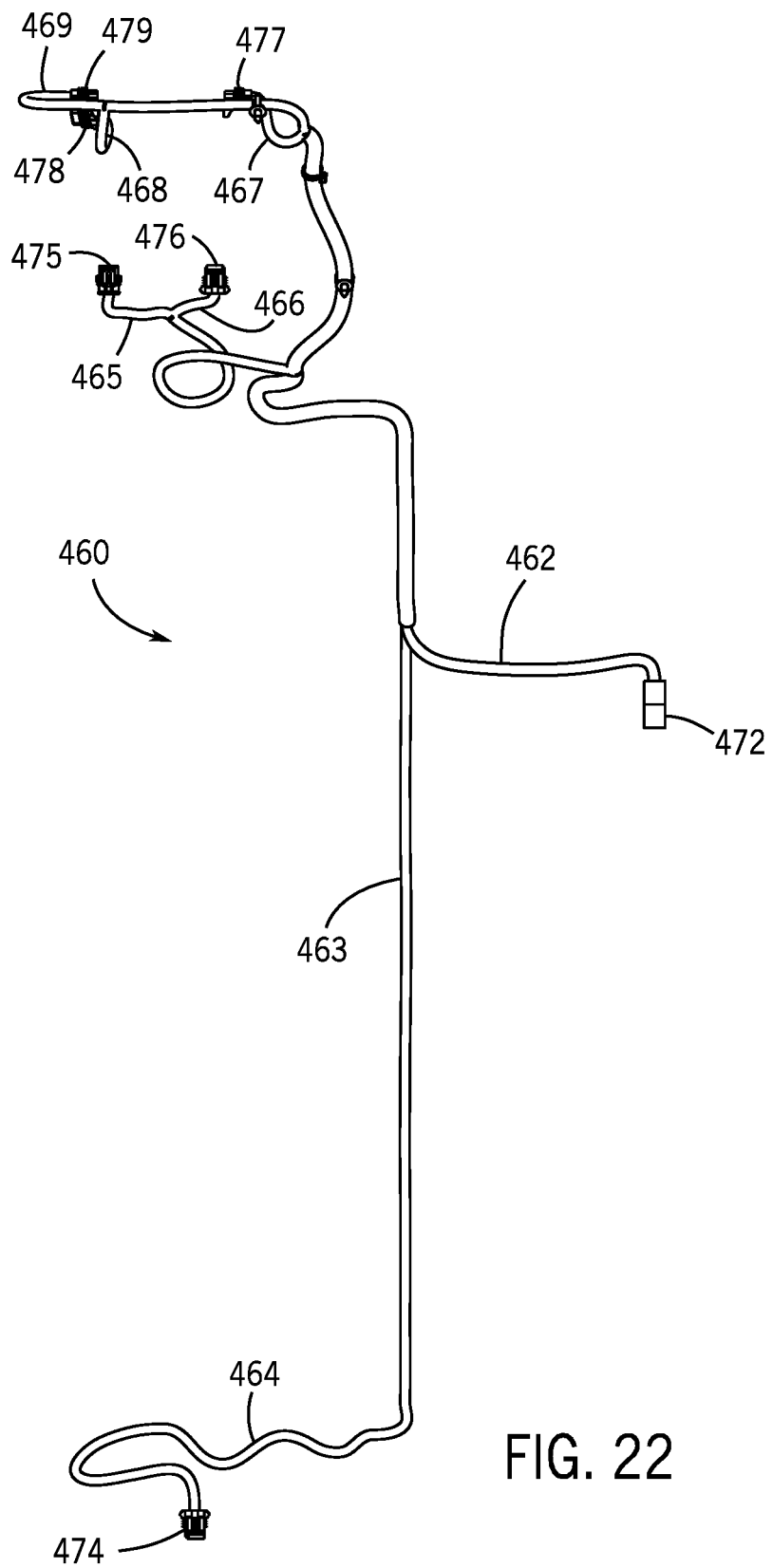
FIG. 22 is a view of a wiring harness that may be incorporated into the rear fender assembly of FIG. 12.

With reference to FIG. 22, the wiring harness 460 is depicted removed from the rear fender 200. The wiring harness 460 includes a main connection branch 462 with an electrical connection 472, a main harness section 463, and a number of accessory connection branches 464, 465, 466, 467, 468, 469 with respective electrical connections 474, 475, 476, 477, 478, 479. As described in greater detail below, the main connection branch 462 is configured to be coupled to a source of power and/or signals on the tractor 14, such as a battery, motor, and/or controller. The main harness section 463 extends between the main connection branch 462 and the accessory connection branches 464-469. As described below and as shown in FIG. 20, the wiring harness 460 is arranged within the wiring harness channel 390 such that electrical connection 474 of branch 464 reaches the front light 400; electrical connections 475, 476 of branches 465, 466 reach the rear light 410; electrical connection 477 of branch 467 reaches a power take-off (PTO) switch 450; electrical connection 478 of branch 468 reaches the SCV switches 420; and electrical connection 479 of branch 469 reaches the hitch switches 430.

The wiring harness 460 may have a length (and/or section or branch lengths) suitable for the relatively narrow rear fender 200, the relatively wide rear fender 200', or both sizes of fenders 200, 200'.

Figure 23:
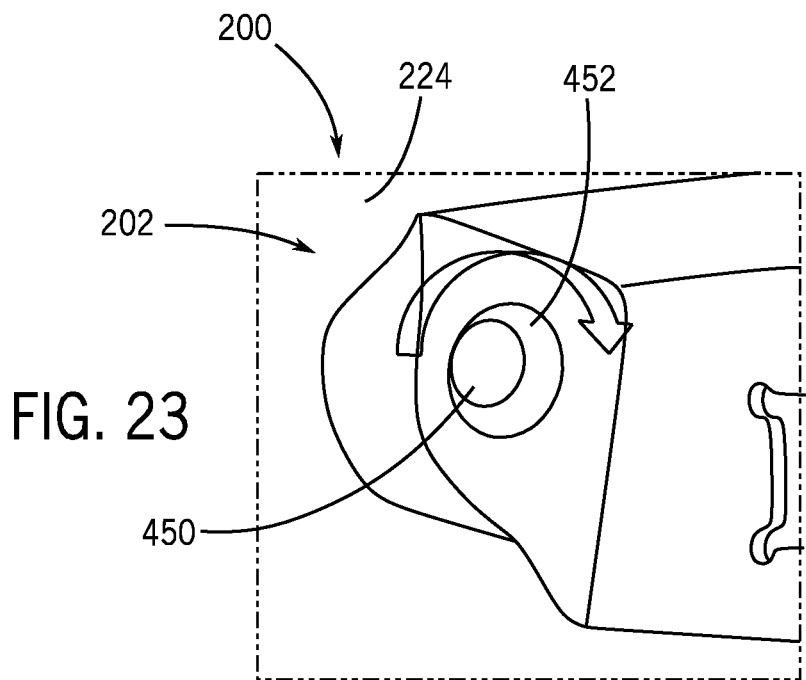
FIG. 23 is a perspective view of a PTO switch that may be incorporated into the rear fender assembly of FIG. 12.

Reference is now made to FIG. 23, which is a closer view of the PTO switch 450 that may be incorporated into the rear fender 200. In one example, the PTO switch 450 is mounted to the aft body section 224 of the primary rear fender body 202. The aft body section 224 defines a bore 452 into which the PTO switch 450 may be inserted. Upon insertion, the one side of the PTO switch 450 may be positioned relative to the bottom surface 250 such that the PTO switch 450 may be electrically coupled to the connection 477 of the wiring harness 460. During operation, the PTO switches 450 may be manipulated (e.g., pushed, pulled, and/or turned) in order to selectively activate or deactivate a PTO output shaft (not shown) of the tractor 14.

Figure 24:
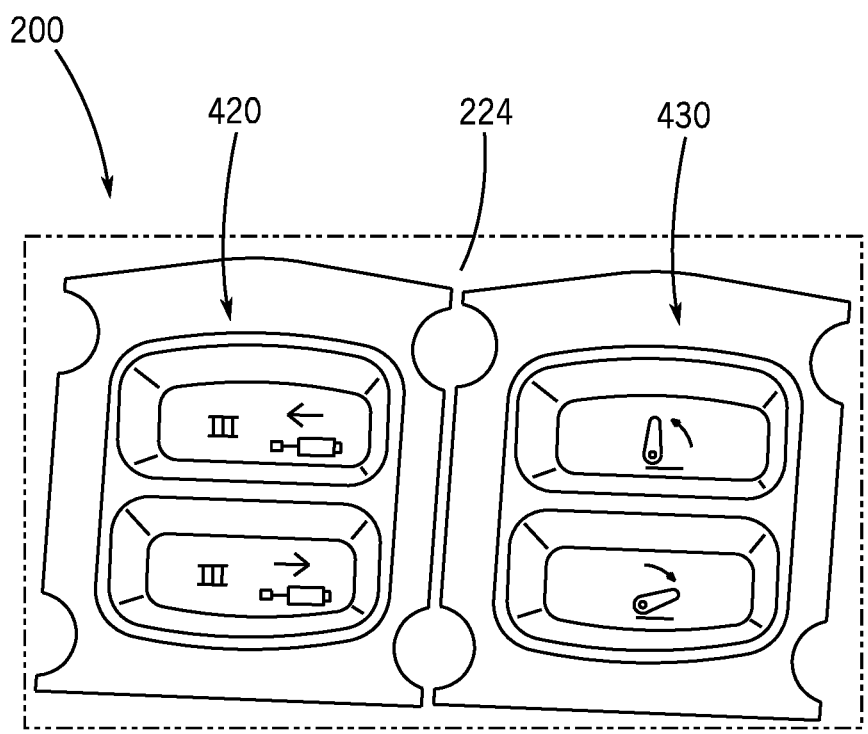
FIG. 24 is view of the accessory switches that may be incorporated into the rear fender assembly of FIG. 12.

Reference is now made to FIG. 24, which is a closer view of the SCV switches 420 and hitch switches 430 that may be incorporated into the rear fender 200. In one example, the SCV switches 420 and hitch switches 430 are mounted adjacent to one another on the aft body section 224 of the primary rear fender body 202. The aft body section 224 defines one or more apertures into which the switches 420, 430 may be inserted. Upon insertion, the one side of each of the SCV switches 420 and hitch switches 430 may be positioned relative to the bottom surface 250 such that the SCV switches 420 and hitch switches 430 may be electrically coupled to the appropriate electrical connections 478, 479 of the wiring harness 460. During operation, the SCV switches 420 may be manipulated (e.g., pushed) in order to selectively open or close one or more select control valves (not shown) of the tractor 14, and the hitch switches 430 may be manipulated (e.g., pushed) in order to selectively raise or lower a rear hitch (not shown) of the tractor 14.

Figure 25:
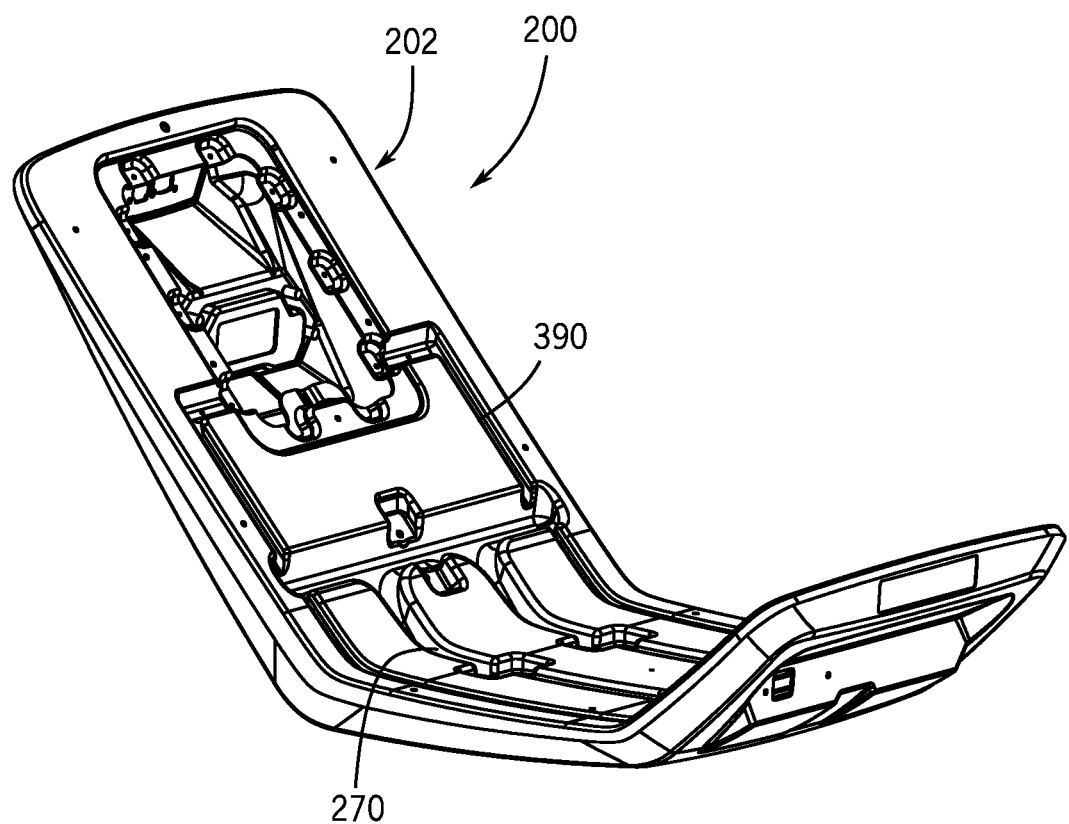
FIGS. 25-34 are various views of the assembly of the rear fender assembly of FIG. 12.

The assembly of the rear fender assembly 12 is described with reference to FIGS. 25-32. Initially, as depicted in FIG. 25, the primary rear fender body 202 is provided. As shown, the primary rear fender body 202 may be formed from one piece into which the support structure coupling channel 270, the wiring harness channel 390, and the various voids, recesses, projections, and/or mounting locations for the accessories 400, 410, 420, 430, 440, 450 may be provided.

Figure 26:
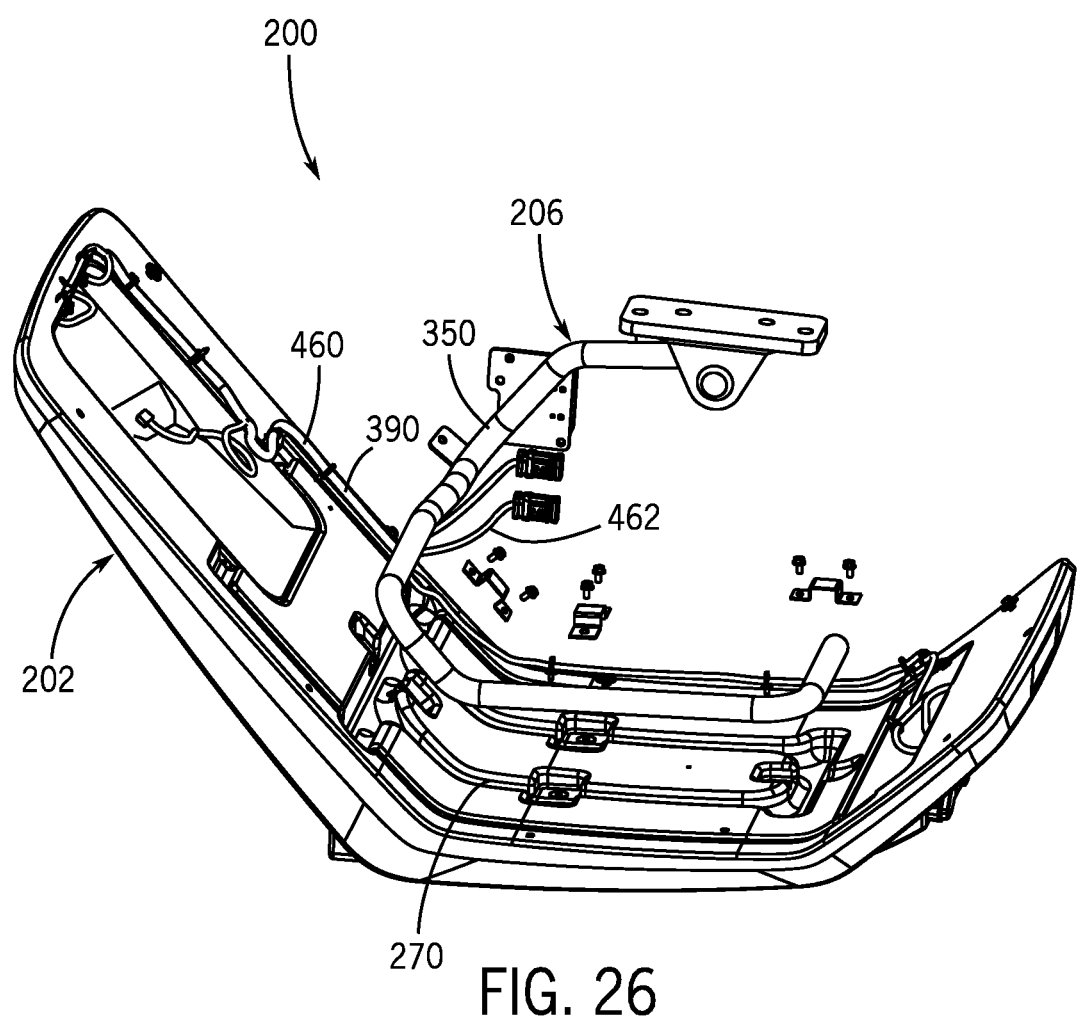

As shown in FIG. 26, the wiring harness 460 is installed into the wiring harness channel 390 of the primary rear fender body 202. As noted above, the wiring harness channel 390 is generally U-shaped to receive the wiring harness 460. Fastening mechanism, such as clips, clamps, or hoops, may be provided to secure the wiring harness 460 within the wiring harness channel 390. As shown, the wiring harness 460 is positioned such that the electrical connections 474-479 are appropriately positioned for connection. The main connection branch 462 of the wiring harness 460 extends out of the wiring harness channel 390 for subsequent connection into a source of power and/or signals, as discussed below.

As also shown in FIG. 26, the support structure 206 is also mounted onto the primary rear fender body 202 by arranging the mounting rod 350 of the support structure coupling channel 270, as described above.

As noted above, the rear fender 200 and support structure 206 in FIG. 26 are incorporated into a left side rear fender assembly 12. Although not shown in detail, a support structure 206 for a right side fender assembly may be a mirror image of the support structure 206 depicted in FIG. 26. Since the support structure coupling channel 270 is generally annular in which one side portion 272, 274 is utilized, the primary rear fender body 202 for a left side rear fender assembly 12 may also be used for a right side fender assembly. In other words, support structure coupling channel 270 may be configured to accept a right or left side rear fender support structure 206. Similarly, the wiring harness channel 390 extends along both sides of the primary rear fender body 202. This enables the wiring harness channel 390 to accommodate a wiring harness 460 on either side.

Figure 28:
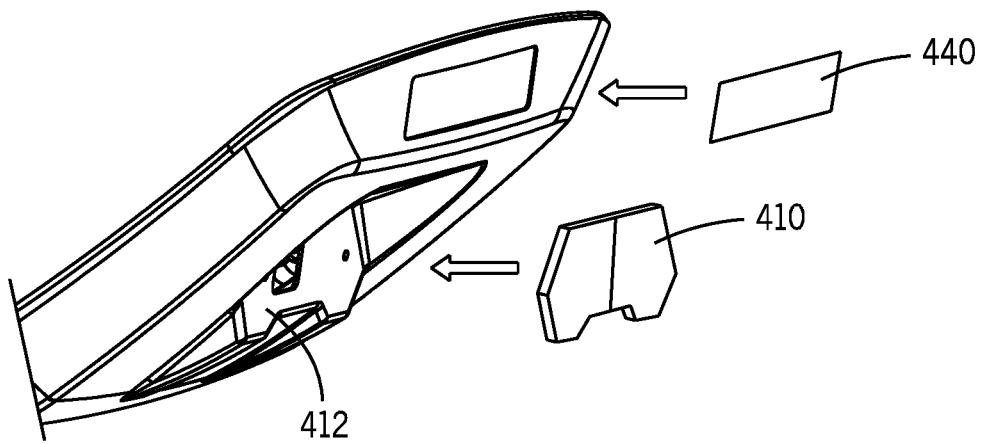
Figure 27:
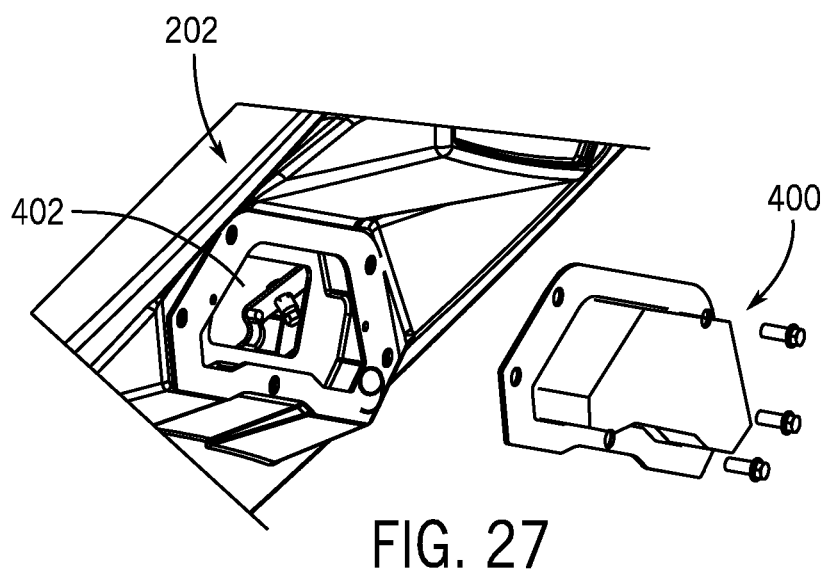
Figure 29:
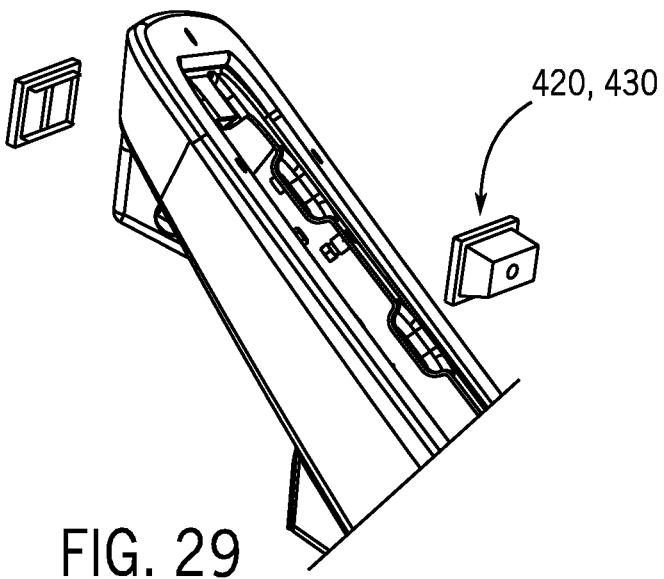

Subsequently, the accessories are mounted to the primary rear fender body 202. As shown, in FIG. 27 the front light 400 is received in an aperture 402 formed on the primary rear fender body portion. The front light 400 and the primary rear fender body 202 may have corresponding bores that receive fasteners, such as screws, to secure the front light 400. As shown in FIG. 28, the rear light 410 is received in an aperture 412 formed on the primary rear fender body 202. The rear light 410 and the primary rear fender body 202 may have corresponding bores that receive fasteners, such as screws, to secure the rear light 410. A reflector 440 may also be secured to the primary rear fender body 202 in any suitable manner, including screws, clips, detents, fasteners, and adhesive. Additional signs, flags, reflectors, and the like may be attached to the top surface 230 or bottom surface 250 in any suitable manner. Further, as shown in FIG. 29, the SCV switches 420 and hitch switches 430 may also be secured to the primary rear fender body 202 in any suitable manner, including screws, clips, detents, fasteners, and adhesive. In one example, the switches 420, 430 may be inserted into apertures from the bottom surface 250 and a plate may be provided on the top surface 230 to surround the switches 420, 430, and subsequently, fasteners may be provided to couple the plate to the switches through the surface of the primary rear fender body 202, thereby securing the switches 420, 430.

Figure 30:
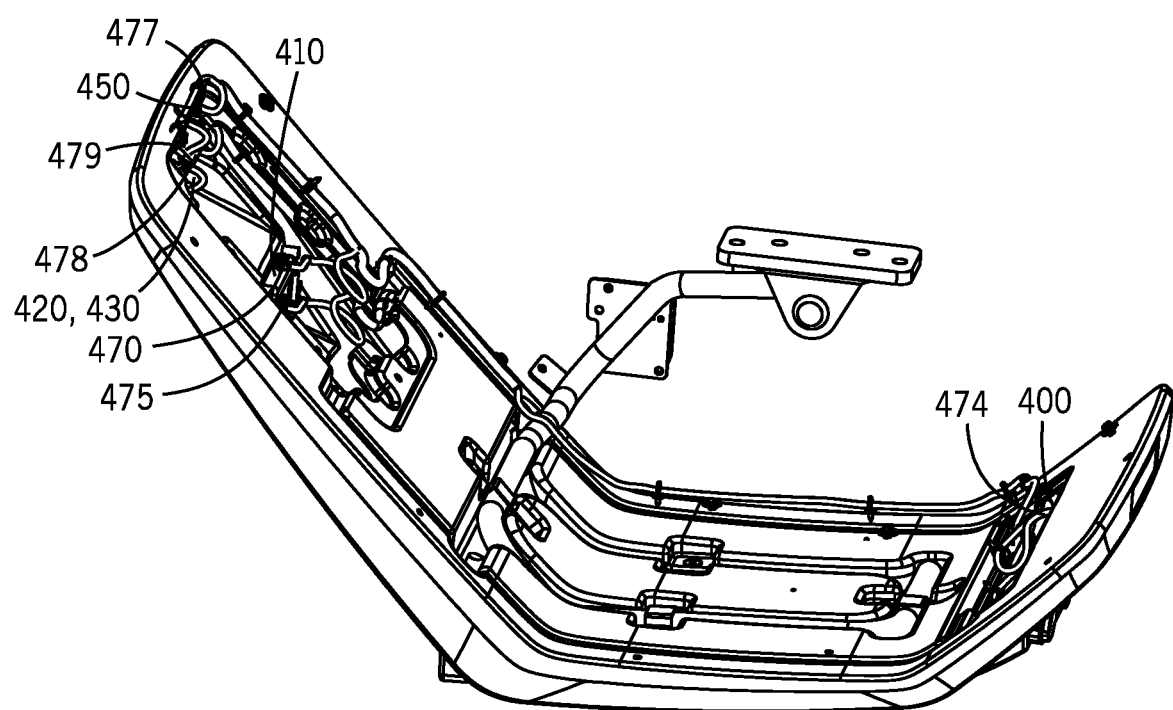

As shown in FIG. 30, the accessories 400, 410, 420, 430, 450 are electrically connected to the wiring harness 460. In particular, the following couplings may be implemented: electrical connection 474 to the front light 400; electrical connections 475, 476 to the rear light 410; electrical connection 477 to the PTO switch 450; electrical connection 478 to the SCV switches 420; and electrical connection 479 to the hitch switches 430. Further, the main connection branch 462 is secured to the mounting rod 350.

Figure 31:
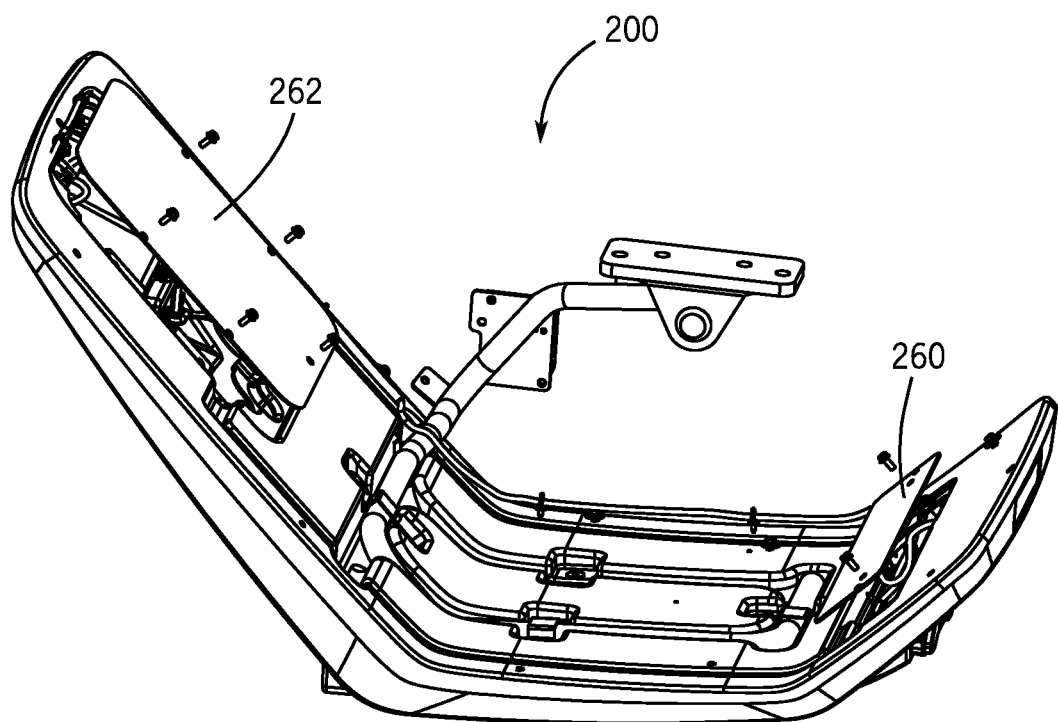

As shown in FIG. 31, the front and rear underside panels 260, 262 are secured to the primary rear fender body 202. The front and rear underside panels 260, 262 may be secured in any suitable manner, including screws. In one example, the front and rear underside panels 260, 262 function to cover the electrical connections 474-479.

Figure 32:
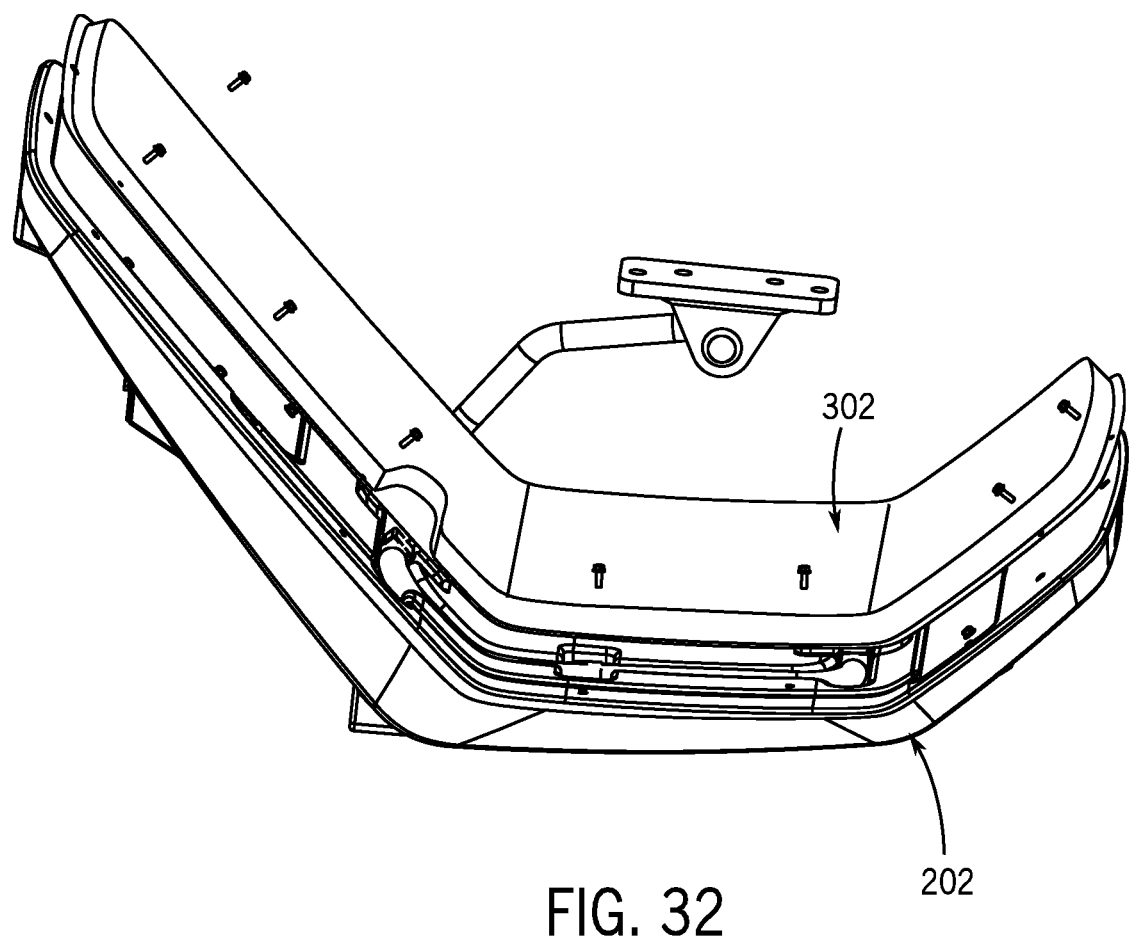

As shown in FIG. 32, the side rear fender body 302 is fastened to one side of the primary rear fender body 202. The primary rear fender body 202 and side rear fender body 302 may have corresponding rows of fastening bores that, upon alignment, are configured to receive fasteners to attach the rear fender bodies 202, 302. In one example, both sides of the primary rear fender body 202 may have a row of fastening bores. As introduced above, this enables both right and left side rear fender body portions to be attached to the primary rear fender body 202 such that a common primary rear fender body 202 may be incorporated into both right side and left side rear fender assemblies 12.

Figure 33:
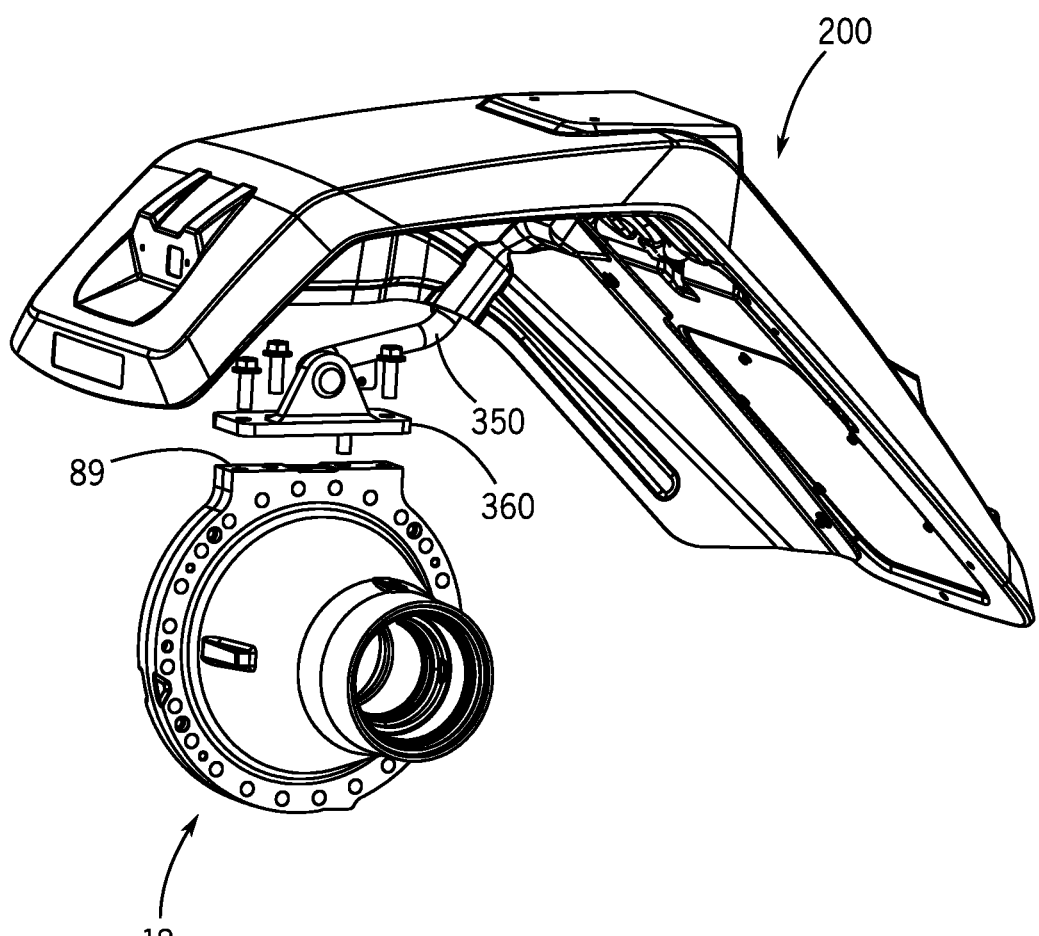
Figure 34:
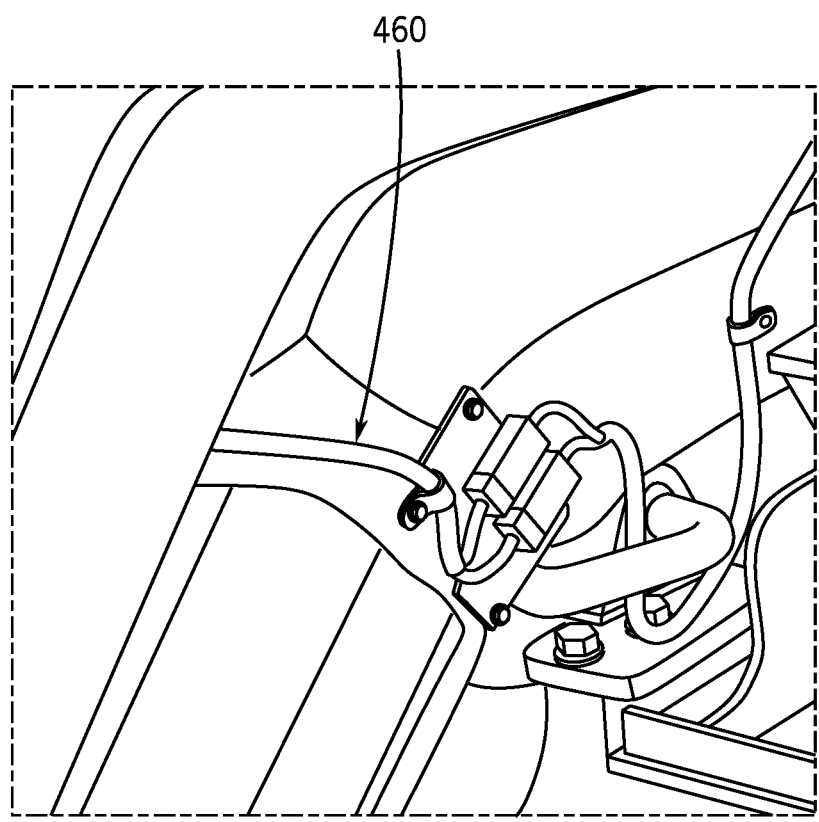

Subsequently, as shown in FIG. 33, the rear fender assembly 12 may be mounted to the rear track system 18 (partially shown). As noted above, the mounting flange 360 on the end of the mounting rod 350 is mounted to the fender mounting platform 89 on the axle housing 61. In one example, bolts and aligned fastening bores (e.g., four of each) are utilized to secure the rear fender assembly 12 to the axle housing 61, and thus, the rear track system 18. Finally, as shown in FIG. 34, the wiring harness 460 is electrically coupled to the source from the tractor 14, such as a tractor wiring assembly. In one example, the wiring harness 460 may be electrically coupled to the source on the tractor 14 at or proximate to the fender flange 384. Subsequently, a cover (not shown) may be provided on the fender flange 384 to secure and protect the electrical coupling.

Upon assembling and mounting the rear fender 200 for one side, the process may be repeated for the other side. The rear fenders 200' for the wider tractor track width TW may similarly be assembled and installed.

By coupling the rear fender 200 only to the track system 18, particularly the axle housing 61, a tractor track width W of the tractor 14 may be modified without requiring an adjustment of the rear fender 200. In this regard, as the rear fender 200 is coupled to the respective track system 18, the rear fender 200 moves with the track system 18 during an adjustment of the tractor track width W. This improves operator satisfaction and ensures that debris does not accumulate on the cab 40 in any tractor track width W of the tractor 14. This characteristic is valid with respect to relatively narrow track system widths TW and associated rear fenders 200 and for relatively wide track system widths TW and associated rear fenders 200'.

Figure 35:
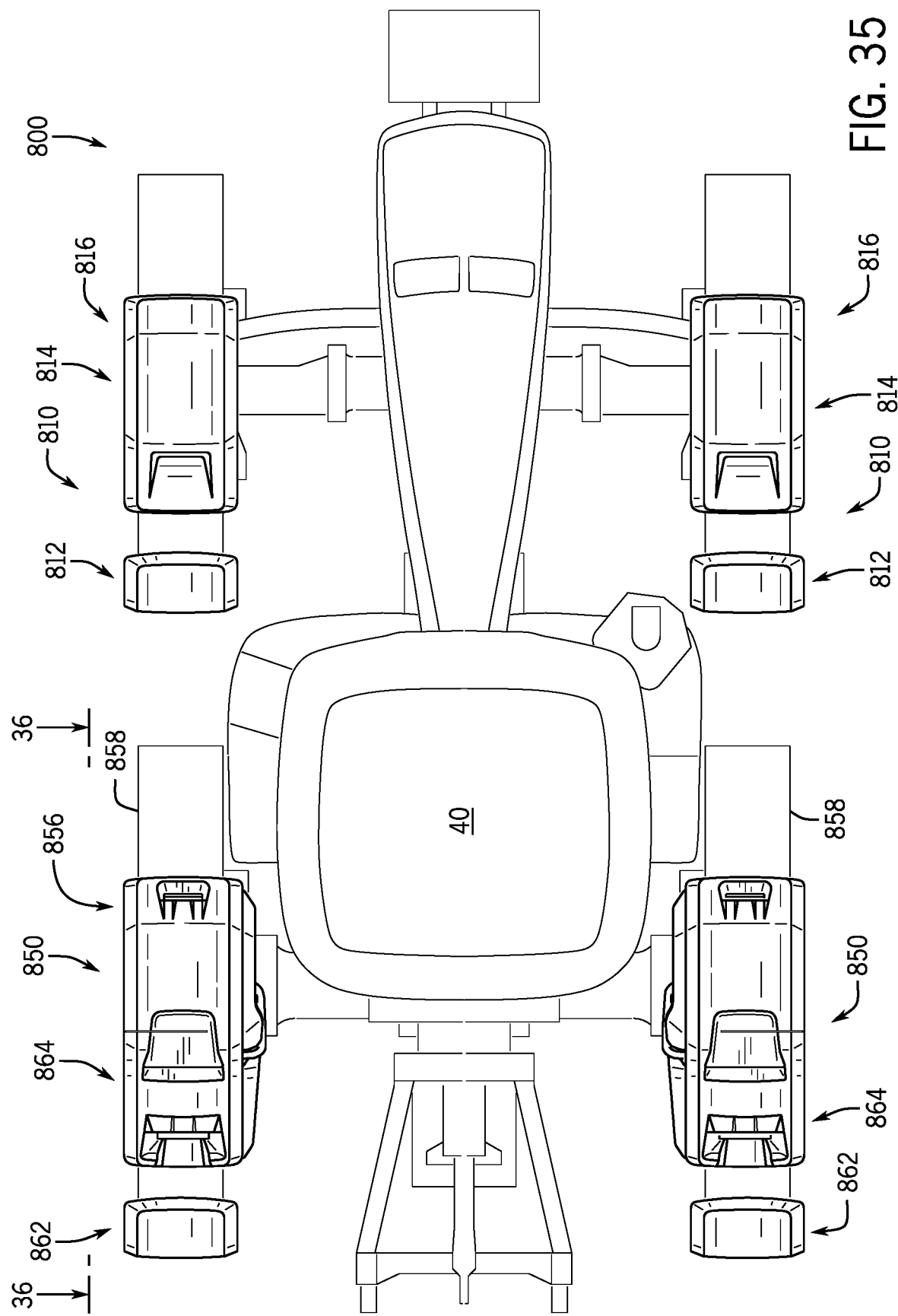
FIG. 35 is a top view of a track tractor that includes a front fender assembly and a rear fender assembly in accordance with various embodiments.

FIG. 35 is a top view of a track tractor 800 that includes a front fender assembly 810 and a rear fender assembly 850 in accordance with various embodiments. Unless otherwise noted, front fender assembly 810 is similar to the front fender assemblies discussed above, e.g., front fender assembly 10, 10'. As above, each front fender assembly 810 includes a front lower fender 812 and a front upper fender 814 that are attached to the front track systems 816. Unless otherwise noted, the rear fender assembly 850 may also be similar to the rear fender assemblies discussed above, e.g., rear fender assembly 12, 12'. For example, the rear fender assembly 850 may include a rear upper fender 864 that is similar to the rear fenders 200, 200' discussed above. In particular, the rear upper fender 864 may be coupled to the axle housing (not shown) of the rear track system 856. However, in this embodiment, the rear fender assembly 850 further includes a rear lower fender 862 that is similar in structure and configuration to the lower fenders 100, 100' discussed above with reference to the front fender assemblies 10, 10', 810. In particular, the rear lower fender 862 may be mounted to the undercarriage frame (not shown) of the rear track system 856. The rear lower fender 862 with the rear fender assembly 850 provides an additional structure for inhibiting debris from being thrown from the tracks during a movement of the tractor 800 and also inhibits debris from accumulating on an implement towed by the tractor 800.

FIG. 36 is a side detail view of a track system of the track tractor 800 of FIG. 34, taken from 35, which illustrates a position of the rear fender assembly 850 during an oscillation of the track 858 of the track system 856. As the track 858 oscillates during motion of the tractor 800, the distance D3 and the distance D4 is maintained between the lower fender body of the rear lower fender 862. This ensures that a clearance is maintained between the rear lower fender 862 and the track 858 and inhibits contact during a movement of the tractor 800. In one example, D3 and/or D4 may range from about 30 millimeters (mm) to about 110 millimeters (mm), although any suitable distances may be provided and maintained.

As such, aspects of the front and rear fender assemblies 10, 10', 12, 12', 810, 850 may be used independently or in conjunction with one another, thereby providing solutions for vehicles with a variety of tractor track widths and/or track system widths in order to enable improved performance with respect to track interference and the prevention of debris accumulation.

Also, the following examples are provided, which are numbered for easier reference:

1. A track work vehicle comprising: a track system including a drive wheel supported by an axle housing that drives a continuous ground-engaging track, a saddle assembly that guides the track about the drive wheel and an undercarriage frame that supports one or more idler wheels that guide the track along a ground surface; and a fender assembly that includes at least one fender coupled to the axle housing to overlap a portion of the track.

2. The track work vehicle of example 1, wherein the at least one fender is at least one rear fender.

3. The track work vehicle of example 2, wherein the at least one rear fender includes a forward body section, a middle body section, and an aft body section, the forward body section extending from the middle body section at a first angle and the aft body section extending from the middle body section at a second angle.

4. The track work vehicle of example 2, wherein the at least one rear fender includes a primary rear fender body and a side rear fender body, and wherein the primary rear fender body has inboard and outboard edges, the side rear fender body being attached to the inboard edge of the primary rear fender body.

5. The track work vehicle of example 4, wherein the side rear fender body extends at an angle relative to the primary rear fender body.

6. The track work vehicle of example 2, wherein the at least one rear fender includes a body and a support structure, the support structure interconnecting the body to the axle housing.

7. The track work vehicle of example 6, wherein the body has a front surface and an opposite rear surface that defines a coupling channel, and the support structure has a first end that is at least partially received within the coupling channel.

8. The track work vehicle of example 6, wherein the coupling channel is generally annular with a forward portion, an inboard side portion, an aft portion, and an outboard side portion, the support structure being received by the forward portion, the aft portion, and the outboard side portion.

9. The track work vehicle of example 6, wherein the support structure includes a mounting flange arranged on a second end of the support structure, and wherein the axle housing defines a planar fender mounting platform that receives the mounting flange of the support structure for securing the at least one rear fender to the axle housing.

10. The track work vehicle of example 9, wherein the support structure includes a plurality of support structure segments that are angled relative to one another such that the support structure maintains a predetermined distance between the at least one rear fender and the portion of the track.

11. The track work vehicle of example 6, further comprising at least one accessory mounted on the at least one rear fender.

12. The track work vehicle of example 11, further comprising a wiring harness coupled to the at least one rear fender and configured to transmit at least one of power or signal for the at least one accessory.

13. The track work vehicle of example 12, wherein the body has a front surface and an opposite rear surface that defines a wiring harness channel that receives the wiring harness.

14. The track work vehicle of example 13, wherein the at least one accessory is a light.

15. The track work vehicle of example 13, wherein the at least one accessory is at least one of a select control valve (SCV) switch, a power take-off (PTO) switch, or a hitch switch.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A track work vehicle having a tractor track width between tracks at left and right sides of the track work vehicle, the track work vehicle comprising:
   a track system including a drive wheel supported by an axle housing that drives a continuous ground-engaging track, a saddle assembly that guides the track about the drive wheel and an undercarriage frame that supports one or more idler wheels that guide the track along a ground surface; and
   a fender assembly that includes at least one fender with a body overlapping a portion of the track and a support structure interconnecting the body only to the axle housing of the track system;
   wherein the body and the support structure move with the track system during an adjustment of the track width without requiring an adjustment of the fender assembly.

2. The track work vehicle of claim 1, wherein the at least one fender is at least one rear fender.

3. The track work vehicle of claim 2, wherein the at least one rear fender includes a forward body section, a middle body section, and an aft body section, the forward body section extending from the middle body section at a first angle and the aft body section extending from the middle body section at a second angle.

4. The track work vehicle of claim 2, wherein the at least one rear fender includes a primary rear fender body and a side rear fender body, and wherein the primary rear fender body has inboard and outboard edges, the side rear fender body being attached to the inboard edge of the primary rear fender body.

5. The track work vehicle of claim 4, wherein the side rear fender body extends at an angle relative to the primary rear fender body.

6. The track work vehicle of claim 1, wherein the body has a front surface and an opposite rear surface that defines a coupling channel, and the support structure has a first end that is at least partially received within the coupling channel.

7. The track work vehicle of claim 6, wherein the coupling channel is generally annular with a forward portion, an inboard side portion, an aft portion, and an outboard side portion, the support structure being received by the forward portion, the aft portion, and the outboard side portion.

8. The track work vehicle of claim 2, wherein the support structure includes a mounting flange arranged on a second end of the support structure, and wherein the axle housing defines a planar fender mounting platform that receives the mounting flange of the support structure for securing the at least one rear fender to the axle housing.

9. The track work vehicle of claim 8, wherein the support structure includes a plurality of support structure segments that are angled relative to one another such that the support structure maintains a predetermined distance between the at least one rear fender and the portion of the track.

10. The track work vehicle of claim 2, further comprising at least one accessory mounted on the at least one rear fender.

11. The track work vehicle of claim 10, further comprising a wiring harness coupled to the at least one rear fender and configured to transmit power or a signal for the at least one accessory.

12. A track work vehicle comprising:
   a track system including a drive wheel supported by an axle housing that drives a continuous ground-engaging track, a saddle assembly that guides the track about the drive wheel and an undercarriage frame that supports one or more idler wheels that guide the track along a ground surface;
   a fender assembly that includes at least one fender coupled to the axle housing to overlap a portion of the track, the fender assembly including a body and a support structure, the support structure interconnecting the body to the axle housing;
   at least one accessory mounted on the at least one fender; and
   a wiring harness coupled to the at least one fender and configured to transmit power or a signal to the at least one accessory;
   wherein the body has a front surface and an opposite rear surface that defines a wiring harness channel that receives the wiring harness.

13. The track work vehicle of claim 12, wherein the at least one accessory is a light.

14. The track work vehicle of claim 12, wherein the at least one accessory is a select control valve (SCV) switch, a power take-off (PTO) switch, or a hitch switch.

15. A rear fender assembly for a work vehicle with a track system having a drive wheel that drives a continuous ground-engaging track, a saddle assembly that guides the track about the drive wheel and an undercarriage frame that supports one or more idler wheels that guide the track along a ground surface, the rear fender assembly comprising:
   at least one rear fender body having a front surface and an opposite rear surface that defines a coupling channel;
   a support structure with a first end received in the coupling channel of the body and second end having a mounting flange configured for securement to a planar fender mounting platform of the axle housing such that the at least one rear fender body is mounted to the axle housing; and
   at least one accessory including a light, a select control valve (SCV) switch, a power take-off (PTO) switch, or a hitch switch;
   wherein the coupling channel is generally annular with a forward portion, an inboard side portion, an aft portion, and an outboard side portion, the support structure being received by the forward portion, the aft portion, and the outboard side portion;

wherein the support structure includes a plurality of support structure segments that are angled relative to one another such that the support structure maintains a predetermined distance between the at least one rear fender body and the track;

wherein the at least one rear fender body includes a primary rear fender body and a side rear fender body, and wherein the primary rear fender body has inboard and outboard edges, the side rear fender body attached to the inboard edge of the primary rear fender body; and wherein the at least one accessory is mounted on the primary rear fender body.

\* \* \* \* \*